United States Patent
Yoshida et al.

(10) Patent No.: US 7,765,296 B2
(45) Date of Patent: Jul. 27, 2010

(54) NETWORK CONTROL APPARATUS, NETWORK CONTROL METHOD, STORAGE MEDIUM

(75) Inventors: Masashi Yoshida, Kawasaki (JP); Takeo Sakimura, Urayasu (JP)

(73) Assignee: Canon Kabushiki Kaisha, Tokyo (JP)

( * ) Notice: Subject to any disclaimer, the term of this patent is extended or adjusted under 35 U.S.C. 154(b) by 156 days.

(21) Appl. No.: 12/055,126

(22) Filed: Mar. 25, 2008

(65) Prior Publication Data
US 2008/0244066 A1 Oct. 2, 2008

(30) Foreign Application Priority Data
Mar. 27, 2007 (JP) ............................. 2007-081799

(51) Int. Cl.
G06F 15/173 (2006.01)
H04N 5/76 (2006.01)
(52) U.S. Cl. .................................... 709/224; 348/231.2
(58) Field of Classification Search ................. 348/143, 348/207.11, 207.2, 231.2, 231.6; 396/287; 715/762, 835; 710/5; 709/224
See application file for complete search history.

(56) References Cited

U.S. PATENT DOCUMENTS

| | | | |
|---|---|---|---|
| 6,795,094 B1 * | 9/2004 | Watanabe et al. | 715/762 |
| 7,437,681 B2 * | 10/2008 | Misawa et al. | 715/835 |
| 2002/0135680 A1 * | 9/2002 | Haruki | 348/207.2 |
| 2004/0012810 A1 | 1/2004 | Haas et al. | |
| 2004/0150724 A1 | 8/2004 | Nozaki et al. | |
| 2004/0165063 A1 * | 8/2004 | Iida et al. | 348/143 |
| 2004/0183915 A1 * | 9/2004 | Gotohda et al. | 348/207.11 |
| 2005/0038923 A1 * | 2/2005 | Kamataki | 710/5 |
| 2005/0265692 A1 | 12/2005 | Kaku et al. | |
| 2006/0170956 A1 | 8/2006 | Jung et al. | |
| 2006/0280497 A1 * | 12/2006 | Wakabayashi | 396/287 |
| 2007/0024722 A1 * | 2/2007 | Eura et al. | 348/231.2 |
| 2008/0095451 A1 * | 4/2008 | Nakamura | 382/232 |
| 2008/0174676 A1 * | 7/2008 | Squilla et al. | 348/231.6 |

FOREIGN PATENT DOCUMENTS

JP 2005-341391 A 12/2005

* cited by examiner

*Primary Examiner*—Jungwon Chang
(74) *Attorney, Agent, or Firm*—Canon U.S.A., Inc. I.P. Division

(57) ABSTRACT

A network control apparatus forming a network with a plurality of image-processing apparatuses acquires attribute information about images stored in each image-processing apparatus from the plurality of image-processing apvaluesparatuses, arranges a display order of the images based on the attribute information, detects a change in the configuration of the image-processing apparatuses on the network, and rearranges the display order if a change in the configuration of the image-processing apparatuses on the network is detected.

15 Claims, 16 Drawing Sheets

FIG. 7

701
| PACKET TYPE |
| DESTINATION |
| VALIDITY PERIOD |
| URL OF DEVICE INFORMATION |
| NOTIFICATION TYPE |
| NOTIFICATION SUBTYPE |
| SOURCE INFORMATION |
| DEVICE TYPE |

FIG. 8A

702
| PACKET TYPE |
| DESTINATION |
| SEARCH TYPE |
| WAITING TIME |
| SEARCH TARGET |

FIG. 8B

703
| PACKET TYPE |
| VALIDITY PERIOD |
| SEARCH TYPE TO BE RESPONDED TO |
| URL OF DEVICE INFORMATION |
| SOURCE INFORMATION |
| SEARCH TARGET |
| DEVICE TYPE |

801

| Order | Camera ID | Image ID | Date | Time |
|---|---|---|---|---|
| 1 | Camera 1 | 003.jpg | 05/23/06 | 08 : 12 |
| 2 | Camera 102 | 025.jpg | 05/23/06 | 10 : 32 |
| 3 | Camera 101 | 008.jpg | 05/23/06 | 16 : 40 |
| 4 | Camera 103 | 015.jpg | 05/24/06 | 13 : 33 |
| 5 | Camera 102 | 026.jpg | 05/24/06 | 16 : 42 |
| 6 | Camera 101 | 009.jpg | 05/24/06 | 22 : 01 |
| 7 | Camera 1 | 005.jpg | 05/25/06 | 00 : 25 |
| ... | ... | ... | ... | ... |

| Order | Camera ID | Image ID | Date | Time | |
|---|---|---|---|---|---|
| 1 | Camera 103 | 015.jpg | 05/24/06 | 09 : 47 | ~1701 |
| 2 | Camera 104 | 009.jpg | 05/24/06 | 10 : 19 | ~1702 |
| 3 | Camera 102 | 026.jpg | 05/24/06 | 10 : 42 | ~1703 |
| 4 | Camera 104 | 010.jpg | 05/24/06 | 11 : 42 | ~1704 |
| 5 | Camera 101 | 009.jpg | 05/24/06 | 12 : 01 | ~1705 |
| 6 | Camera 1 | 005.jpg | 05/24/06 | 12 : 25 | ~1706 |
| 7 | Camera 104 | 011.jpg | 05/24/06 | 13 : 18 | ~1707 |
| 8 | Camera 104 | 012.jpg | 05/24/06 | 15 : 03 | ~1708 |
| ... | ... | ... | ... | ... | |

| Order | Camera ID | Image ID | Date | Time | |
|---|---|---|---|---|---|
| ... | ... | ... | ... | ... | |
| A | Camera 102 | 025.jpg | 05/24/06 | 08 : 32 | ~2001 |
| A+1 | Camera 101 | 008.jpg | 05/24/06 | 09 : 35 | ~2002 |
| A+2 | Camera 103 | 015.jpg | 05/24/06 | 09 : 47 | ~2003 |
| A+3 | Camera 102 | 026.jpg | 05/24/06 | 10 : 42 | ~2004 |
| A+4 | Camera 101 | 009.jpg | 05/24/06 | 12 : 01 | ~2005 |
| A+5 | Camera 103 | 016.jpg | 05/24/06 | 12 : 25 | ~2006 |
| ... | ... | ... | ... | ... | |

| Order | Camera ID | Image ID | Date | Time | |
|---|---|---|---|---|---|
| 1 | Camera 102 | 025.jpg | 05/24/06 | 08 : 32 | ~2101 |
| 2 | Camera 101 | 008.jpg | 05/24/06 | 09 : 35 | ~2102 |
| 3 | Camera 102 | 026.jpg | 05/24/06 | 10 : 42 | ~2103 |
| 4 | Camera 101 | 009.jpg | 05/24/06 | 12 : 01 | ~2104 |
| ... | ... | ... | ... | ... | ~2105 |

| Order | Camera ID | Image ID | Date | Time | |
|-------|-----------|----------|----------|---------|------|
| 1 | Camera 101 | 001.jpg | 05/23/06 | 18 : 56 | ~2301 |
| ... | ... | ... | ... | ... | ~2302 |
| A | Camera 102 | 025.jpg | 05/24/06 | 08 : 32 | ~2303 |
| A+1 | Camera 101 | 008.jpg | 05/24/06 | 09 : 35 | ~2304 |
| A+2 | Camera 103 | 015.jpg | 05/24/06 | 09 : 47 | ~2305 |
| A+3 | Camera 102 | 026.jpg | 05/24/06 | 10 : 42 | ~2306 |
| A+4 | Camera 101 | 009.jpg | 05/24/06 | 12 : 01 | ~2307 |
| A+5 | Camera 1 | 005.jpg | 05/24/06 | 12 : 25 | ~2308 |
| ... | ... | ... | ... | ... | |

| Order | Camera ID | Image ID | Date | Time | |
|-------|-----------|----------|----------|---------|------|
| 1 | Camera 104 | 001.jpg | 05/23/06 | 21 : 35 | ~2401 |
| 2 | Camera 104 | 002.jpg | 05/23/06 | 22 : 08 | ~2402 |
| ... | ... | ... | ... | ... | ~2403 |
| B | Camera 104 | 007.jpg | 05/24/06 | 08 : 55 | ~2404 |
| B+1 | Camera 104 | 008.jpg | 05/24/06 | 09 : 12 | ~2405 |
| B+2 | Camera 104 | 009.jpg | 05/24/06 | 10 : 19 | ~2406 |
| B+3 | Camera 104 | 010.jpg | 05/24/06 | 11 : 42 | ~2407 |
| B+4 | Camera 104 | 011.jpg | 05/24/06 | 13 : 18 | ~2408 |
| B+5 | Camera 104 | 012.jpg | 05/24/06 | 15 : 03 | ~2409 |
| ... | ... | ... | ... | ... | |

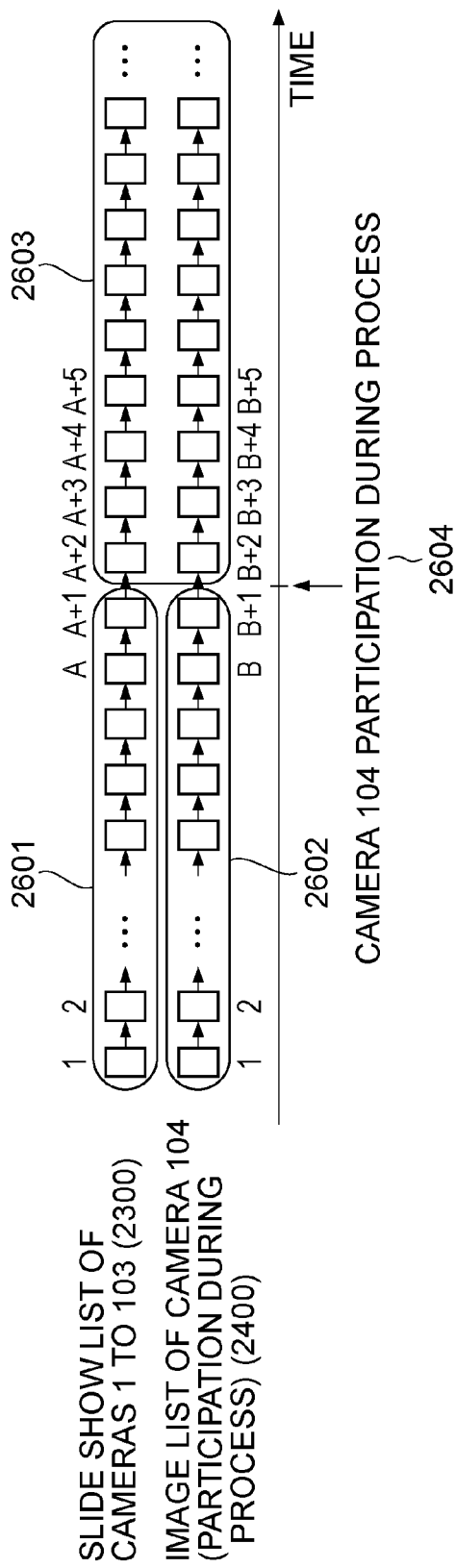

NETWORK CONTROL APPARATUS, NETWORK CONTROL METHOD, STORAGE MEDIUM

BACKGROUND OF THE INVENTION

1. Field of the Invention

The present invention relates to an operation for displaying image data in an image-display apparatus connected to a network. The image data is held in multiple image-processing apparatuses connected to the network.

2. Description of the Related Art

There is an increasing movement to build a home network by connecting digital devices on the network to cause the digital devices to work in cooperation with each other as the digital devices have come into widespread use in recent years. The building of the home network allows the devices on the home network to share Audio Visual (AV) contents, such as music and/or video contents. The interconnectivity between devices in the building of such a home network is defined by Digital Living Network Alliance (DLNA).

DLNA devices acquire Internet Protocol (IP) addresses when they participate in networks and send notices of information about services of their own devices on the networks. DLNA devices having a function of controlling other devices refer to the service information to request the services from the other devices on the network in order to perform various operations.

For example, it is presumed that multiple image-processing apparatuses, such as digital cameras, which hold images and an image-display apparatus capable of displaying the images form a home network. In this case, each image-processing apparatus notifies the apparatuses on the network that the image-processing apparatus provides a service for providing the images when the image-processing apparatus participates in the network. The image-display apparatus notifies the apparatuses on the network that the image-display apparatus provides a service for displaying the images when the image-display apparatus participates in the network. A control apparatus having a function of controlling the other apparatuses on the network refers to the service information to acquire information about the images (data sizes, the dates and times when the images are captured, titles, etc.) from each image-processing apparatus. The control apparatus can display the images in the image-display apparatus in an arbitrary order on the basis of the acquired information to perform a slide show of the images captured by the multiple apparatuses on the network.

Technologies concerning pause and restart of slide shows include a method disclosed in Japanese Patent Laid-Open No. 2005-341391. In the method disclosed in Japanese Patent Laid-Open No. 2005-341391, a restart position is stored when a slide show is paused and the slide show is performed again from the stored restart position in response to an instruction to restart the slide show.

However, the technologies in the related art do not consider participation of new image-processing apparatuses in the home networks after determining the display orders of images in the slide shows.

SUMMARY OF THE INVENTION

The present invention is directed to overcome the above-described drawbacks and disadvantages.

The present invention provides a network system in which images are displayed in a consistent order even if a change in the configuration of the network system occurs to realize a slide show comfortable for a user.

According to an embodiment of the present invention, a network control apparatus adapted to form a network with a plurality of image-processing apparatuses includes an attribute information acquiring unit configured to acquire attribute information about images stored in each image-processing apparatus of the plurality of image-processing apparatuses; an arranging unit configured to arrange a display order of the images based on the attribute information; a display-control unit configured to control a display unit so as to sequentially display the images in accordance with the display order; and a detecting unit configured to detect a change in the configuration of the image-processing apparatuses on the network and to cause the arranging unit to rearrange the display order in response to such a detected change.

According to another embodiment of the present invention, a network includes a network control apparatus, a display unit, and a plurality of image-processing apparatuses.

According to another embodiment of the present invention, a method of controlling a network including a plurality of image-processing apparatuses includes acquiring attribute information about images stored in each image-processing apparatus of the plurality of image-processing apparatuses; arranging a display order of the images based on the attribute information; sequentially displaying the images in a display unit in accordance with the display order; detecting a change in the configuration of the image-processing apparatuses on the network; and rearranging the display order in response to the detected change.

According to another embodiment of the present invention, a computer-readable storage medium stores a program adapted to be executed by a network control apparatus, which controls a network including a plurality of image-processing apparatus. The program when executed causes the network control apparatus to acquire attribute information about images stored in each image-processing apparatus of the plurality of image-processing apparatuses; arrange a display order of the images based on the attribute information; sequentially display the images in a display unit in accordance with the display order; detect a change in the configuration of the image-processing apparatuses on the network; and rearrange the display order in response to the detected change.

Further features and aspects of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the present invention and, together with the description, serve to explain the principles of the present invention.

FIG. 7 illustrates an example of a packet according to the first exemplary embodiment.

FIGS. 8A and 8B illustrate examples of other packets according to the first exemplary embodiment.

FIG. 20 illustrates an image information list according to the second exemplary embodiment.

FIG. 21 illustrates another image information list according to the second exemplary embodiment.

FIG. 23 illustrates an image information list according to the third exemplary embodiment.

FIG. 24 illustrates another image information list according to the third exemplary embodiment.

FIG. 25 illustrates another image information list according to the third exemplary embodiment.

FIG. 26 illustrates a summary of the process according to the third exemplary embodiment.

DESCRIPTION OF THE EMBODIMENTS

Exemplary embodiments, features, and aspects of the present invention will now be described in detail with reference to the attached drawings.

First Exemplary Embodiment

Figure 1:
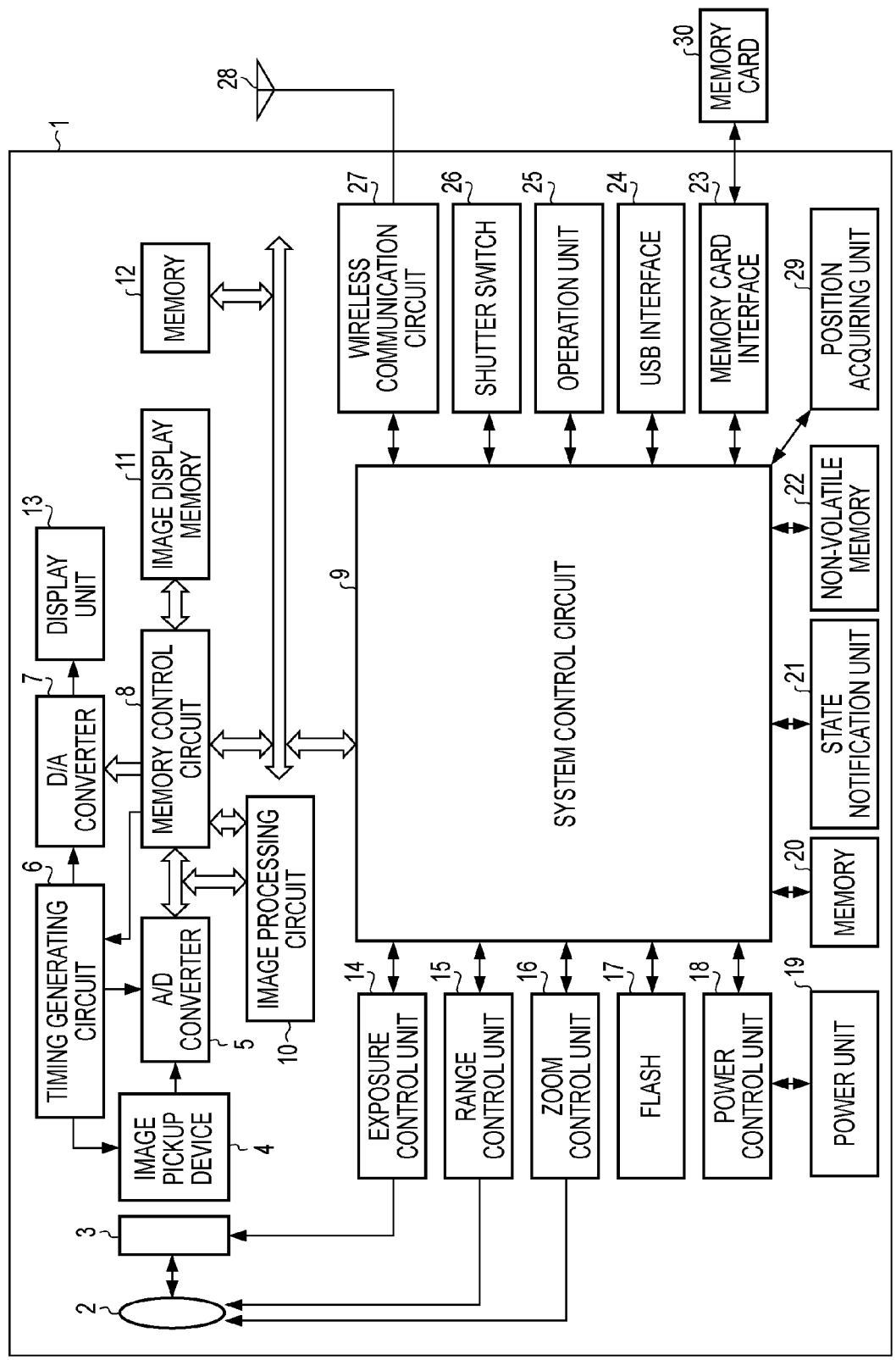
FIG. 1 is a block diagram illustrating an example of the configuration of a digital camera according to a first exemplary embodiment of the present invention.

FIG. 1 is a block diagram illustrating an example of the configuration of a digital camera 1 according to a first exemplary embodiment of the present invention. The configuration of the digital camera 1 according to the present embodiment will now be described.

Referring to FIG. 1, the digital camera 1 includes a lens 2, a shutter 3, an image-pickup device 4, an analog-to-digital (A/D) converter 5, a timing-generating circuit 6, a digital-to-analog (D/A) converter 7, a memory-control circuit 8, a system control circuit 9, an image-processing circuit 10, an image-display memory 11, a memory 12, a display unit 13, an exposure-control unit 14, a range-control unit 15, a zoom-control unit 16, a flash 17, a power-control unit 18, a power unit 19, a memory 20, a state-notification unit 21, a non-volatile memory 22, a memory-card interface 23, a universal serial bus (USB) interface 24, an operation unit 25, a shutter switch 26, a wireless-communication circuit 27, an antenna 28, a position-acquiring unit 29, and a memory card 30.

The shutter 3 has an aperture function. The image-pickup device 4 converts an optical image into an electrical signal. The A/D converter 5 converts the analog electrical signal into a digital signal.

The timing-generating circuit 6 supplies clock signals and control signals to the image-pickup device 4, the A/D converter 5, and the D/A converter 7. The timing-generating circuit 6 is controlled by the memory-control circuit 8 and the system control circuit 9.

The image-processing circuit 10 performs predetermined pixel interpolation and color conversion to data supplied from the A/D converter 5 or data supplied from the memory-control circuit 8.

The memory-control circuit 8 controls the A/D converter 5, the timing-generating circuit 6, the image-processing circuit 10, the image-display memory 11, the D/A converter 7, and the memory 12.

Data in the A/D converter 5 is written in the image-display memory 11 or in the memory 12 through the image-processing circuit 10 and the memory-control circuit 8 or only through the memory-control circuit 8.

The display unit 13 is, for example, a Thin Film Transistor (TFT) liquid crystal display (LCD). Image data for display, written in the image-display memory 11, is displayed in the display unit 13 through the D/A converter 7.

Sequential display of the image data that is captured in the display unit 13 realizes an electronic viewfinder function.

The memory 12 stores still images and moving images that are captured. The memory 12 has a capacity sufficient for storing the still images of a predetermined number and/or the moving images for a predetermined time period.

The exposure-control unit 14 controls the shutter 3 having the aperture function. The exposure-control unit 14 cooperates with the flash 17 to provide a function of controlling flash light.

The range-control unit 15 controls focusing of the lens 2. The zoom-control unit 16 controls zooming of the lens 2.

The flash 17 has a function of emitting automatic flashing (AF) auxiliary light and the function of controlling the flash light.

The system control circuit 9 controls the entire digital camera 1. The system control circuit 9 controls the operations of the components in accordance with signals and/or programs supplied from the components. The memory 20 stores various parameters.

The power-control unit 18 includes a battery detection circuit, a direct current-direct current (DC-DC) converter, and a switching circuit switching blocks to which power is supplied. The power-control unit 18 detects whether the battery is mounted, the type of the battery, and the remaining amount of the battery. The power-control unit 18 controls the DC-DC converter on the basis of the detection result and an instruction from the system control circuit 9 and supplies required voltage to the components including the storage media for a required time period. The power unit 19 includes a primary battery such as an alkaline battery or a lithium battery, a secondary battery such as a nickel-cadmium (NiCd) battery, a nickel-metal hydride (NiMH) battery, or a lithium battery, and an alternate current (AC) adaptor.

The state-notification unit 21 includes a liquid crystal display and a speaker. The liquid crystal display displays the operation states and/or messages by using characters, images, and sounds in response to the execution of the programs by the system control circuit 9. One or more state-notification units 21 are provided at positions near the operation unit 25 of the digital camera 1, where a user can easily visually recognize the states and/or messages displayed in the state-notification units 21. Each state-notification unit 21 includes the liquid crystal display, a light emitting diode (LED), and a sound producing device.

The non-volatile memory 22 is capable of electronically recording data and erasing the recorded data. Wireless setup information about the digital camera 1 can be stored in the non-volatile memory 22. Constants, variables, and programs for the operation of the system control circuit 9 are stored in the memory 20 and the non-volatile memory 22.

The memory-card interface 23 is used to connect to the memory card 30. The USB interface 24 is used to connect to an external device via a USB.

The operation unit 25 is used by the user to input various instructions for the operation of the system control circuit 9. The operation unit 25 includes a switch, a dial, a touch panel, a pointing device by using gaze direction detection, or an audio recognition device or a combination of them.

The shutter switch 26 instructs the start of a series of processes including an exposure process and a developing process. The exposure process writes a signal read out from the image-pickup device 4 in the memory 12 through the A/D converter 5 and the memory-control circuit 8 as image data. The developing process uses arithmetic operations in the image-processing circuit 10 and the memory-control circuit 8.

The wireless-communication circuit 27 transmits and receives radio signals and controls the wireless communication. The antenna 28 is used to perform the wireless communication with another device.

The position-acquiring unit 29 identifies the position of the own device. The position-acquiring unit 29 is exemplified by a global positioning system (GPS), which receives a radio wave from a satellite to identify the position of the own device. The reception of the radio wave may be periodically performed or may be performed at predetermined timing. For example, the radio wave may be received at a time when a certain operation member in the operation unit 25 is operated or may be received at a time when the shutter switch 26 is pressed.

The memory card 30 stores images transmitted through the memory-card interface 23. Although the memory card 30 is detachably mounted in the digital camera 1 in the present embodiment, a storage medium storing the images may be incorporated in the digital camera 1.

Figure 2:
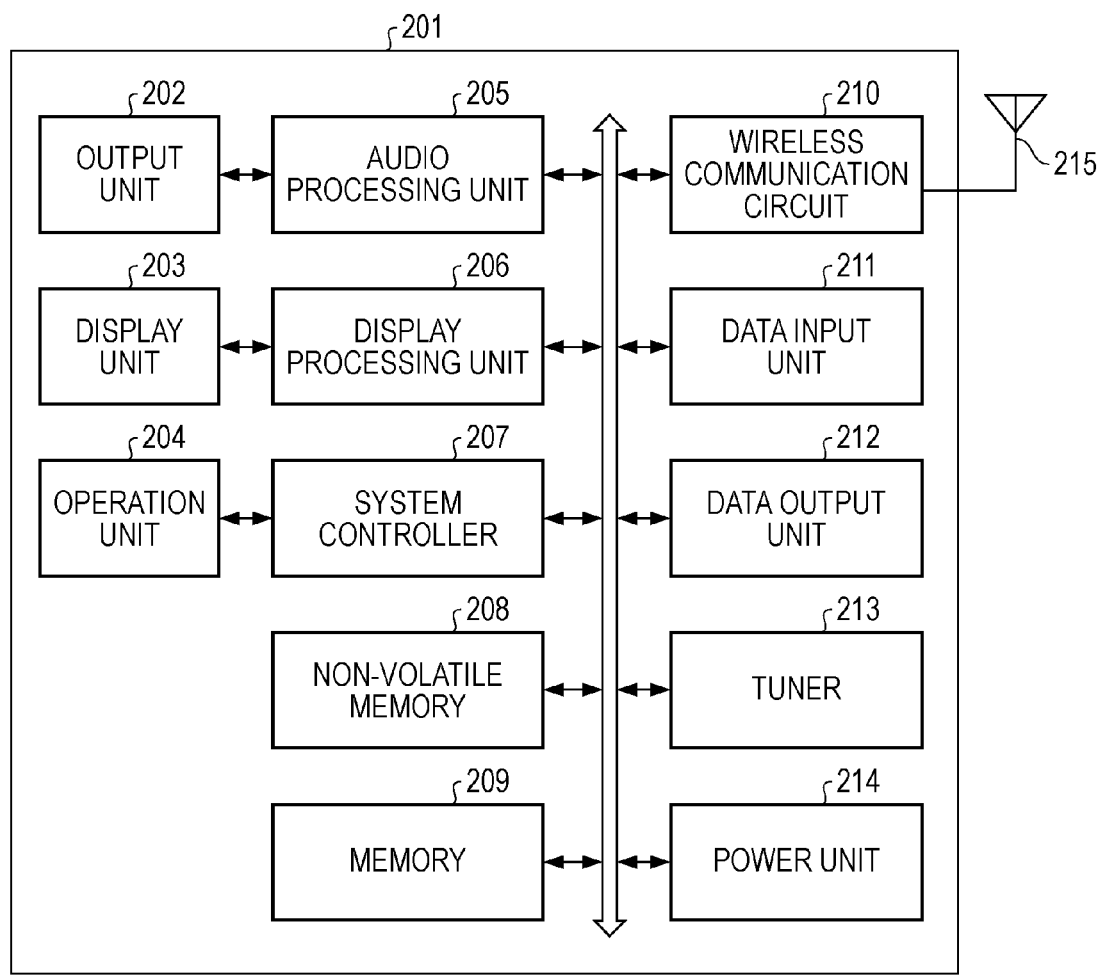
FIG. 2 is a block diagram illustrating an example of the configuration of a television set according to the first exemplary embodiment.

FIG. 2 is a block diagram illustrating an example of the configuration of a television set 201 according to the present embodiment. The configuration of the television set 201 according to the present embodiment will now be described.

The television set 201 includes an output unit 202, a display unit 203, an operation unit 204, an audio-processing unit 205, a display-processing unit 206, a system controller 207, a non-volatile memory 208, a memory 209, a wireless-communication circuit 210, a data-input unit 211, a data-output unit 212, a tuner 213, a power unit 214, and an antenna 215. The output unit 202 receives an output from the audio-processing unit 205 to output, for example, a sound. The display unit 203 displays information processed by the display-processing unit 206 for the user. The operation unit 204 is used by the user to input various operation instructions. The television set 201 receives the instructions through the system controller 207. The non-volatile memory 208 is capable of electronically recording data and erasing the recorded data. Wireless setup information about the television set 201 can be stored in the non-volatile memory 208. Constants, variables, and programs for the operation of the television set 201 are stored in the memory 209. The wireless-communication circuit 210 transmits and receives radio signals and controls the wireless communication. The antenna 215 is used to perform the wireless communication with another device. The data-input unit 211 receives data from an external device. The data-output unit 212 outputs data to an external device. The tuner 213 receives a broadcast signal and supplies the received broadcast signal to the audio-processing unit 205 and the display-processing unit 206.

The television set 201 according to the present embodiment can receive content such as an image, in addition to the broadcast signal, from an information processing apparatus such as a digital camera and can display the received content in the display unit 203.

Multiple digital cameras and the television set 201 having the configurations described above form a network according to the present embodiment. An operation for performing a slide show of images held in the multiple digital cameras in the network will now be described.

System Configuration

A network system that includes the multiple digital cameras and the television set 201 and that performs a slide show of images held in the multiple digital cameras will now be described. Each of the digital camera 1 and digital cameras 101, 102, and 103 is controlled with the system control circuit 9 in accordance with the software programs stored in the non-volatile memory 22 in FIG. 1. The television set 201 is controlled by the system controller 207 in accordance with the software program stored in the non-volatile memory 208 in FIG. 2.

Figure 3:
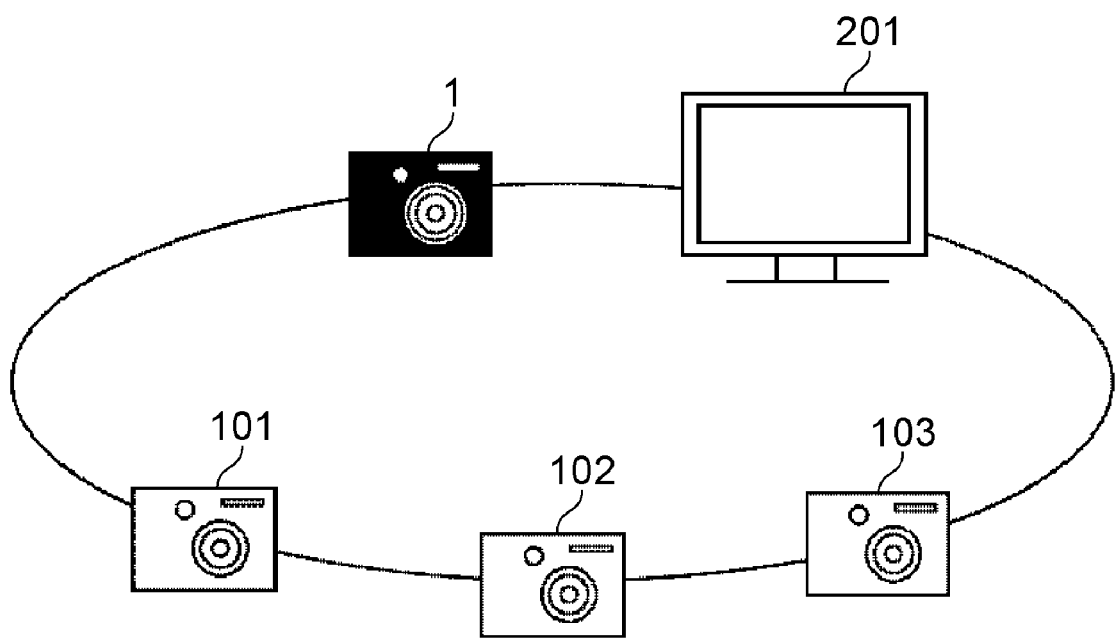
FIG. 3 illustrates an example of the configuration of a network system including the multiple digital cameras and the television set according to the first exemplary embodiment.

FIG. 3 illustrates an example of the configuration of a network system including the multiple digital cameras and the television set 201 according to the present embodiment. The digital cameras 101 to 103 have the same configuration as the digital camera 1 illustrated in FIG. 1. The devices store in advance common information about parameters including service set identifiers (SSIDs), which are network identification information used in general wireless local area networks (LANs), and wireless communication channels, and encryption keys in the memories. The devices form the network over the wireless LAN on the basis of the parameters. The network to be formed in the present embodiment may a wired LAN via a network hub. The present embodiment is not dependent on the configuration of the network to be formed.

In the network system according to the present embodiment, a device having a function of controlling the other devices is selected from the devices on the network. Specifically, one digital camera among the multiple digital cameras has the function of controlling the other digital cameras and the television set 201. The digital camera controlling the other devices is hereinafter referred to as a "parent camera, and the controlled digital cameras are hereinafter referred to as "child cameras". The child cameras store images. Each child camera is capable of providing the images to the other devices on the network under the control of the parent camera. In other words, each child camera operates as a server device on the network.

In the network system according to the present embodiment, the parent camera is capable of collecting information about the images held in the child cameras to display the images in the television set 201 in a form of a slide show. Specifically, the parent camera detects the child cameras on the network and collects the information about the images held in the child cameras to generate a slide show list. The parent camera instructs the child cameras to transfer the image data to the television set 201 in accordance with the slide show list. Sequentially issuing the instructions for every image can realize the slide show operation.

Acquisition of Attribute Information

Figure 4:
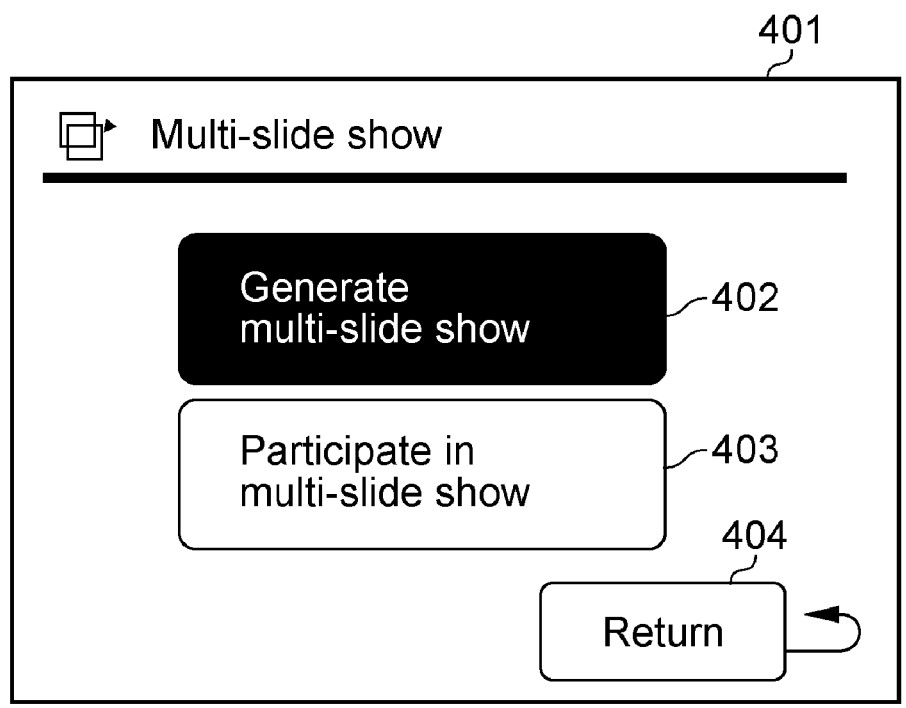
FIG. 4 illustrates a setup user interface used when the function of each digital camera is selected.

FIG. 4 illustrates a setup user interface 401 used when the function of each digital camera in the slide show is selected. The setup user interface 401 for the slide show is displayed in the display unit 13 of the digital camera 1 in response to the user's operation with the operation unit 25 of the digital camera 1.

When the user selects an icon 402 "Generate multi-slide show" in the setup user interface 401, the digital camera 1 is activated as the parent camera. When the user selects an icon 403 "Participate in multi-slide show", the digital camera 1 is activated as the child camera. When the user selects an icon 404 "Return", the digital camera 1 stops the start of the slide show. FIG. 4 illustrates a state where the icon 402 "Generate multi-slide show" is selected. When the user performs a determination operation with an operation member of the digital camera 1, the digital camera 1 is activated as the parent camera (hereinafter referred to as the parent camera 1).

Examples of slide show processes according to the present embodiment will now be described with reference to FIGS. 5 and 6.

Figure 5:
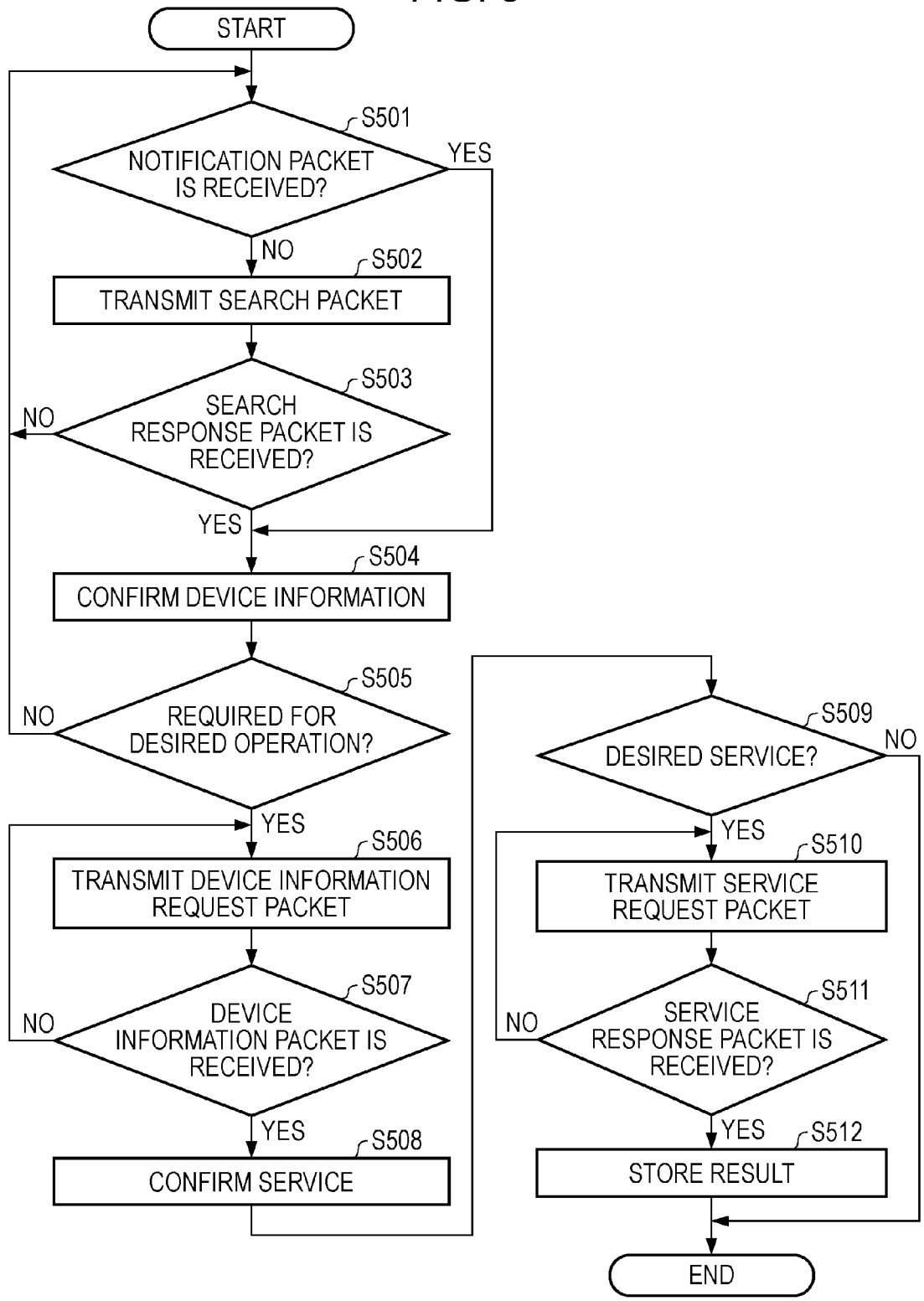
FIG. 5 is a flowchart showing an example of an operation of a parent camera according to the first exemplary embodiment.

FIG. 5 is a flowchart showing an example of the operation of the device having the function of controlling the other devices on the network. According to the present embodiment, the system control circuit 9 of the digital camera activated as the parent camera 1 controls the components to realize the following operation.

The flowchart is started when the digital camera is activated as the parent camera 1.

In Step S501, the parent camera 1 determines whether a notification packet is received. The notification packet is transmitted from the digital camera serving as the child camera to the digital camera serving as the parent camera 1. The notification packet includes information used for forming the network and initial information used by the parent camera 1 to control the child cameras. FIG. 7 illustrates an example of the notification packet according to the present embodiment. A notification packet 701 includes pieces of information "Packet type", "Destination", "Validity period", "Uniform Resource Locator (URL) of device information", "Notification type", "Notification subtype", "Source information", and "Device type". The "Packet type" indicates the type of information communicated between the devices in order to achieve the operation according to the present embodiment and defines "Notification", "Search", "Request", "Response", or the like. In the example illustrated in FIG. 7, information about the "Notification" is described in the notification packet 701. The "Destination" indicates the destination to which the packet is transmitted and is specified with an IP address and a communication port number. For example, in the notification packet, a multicast channel and a port are specified by describing "239.255.255.290:1900". The "URL of device information" indicates the URL of the source device from which the packet is transmitted. For example, the "URL of device information" is described as "http://192.168.0.100:58000/index0". The "Notification type" defines a method of notifying another device connected to the device of the packet. For example, a method of transmitting the packet to the root device, such as the parent camera according to the present embodiment; a method of transmitting the packet to each device, such as the child camera; or a method of transmitting the packet to a service is defined as the "Notification type". According to the present embodiment, the "method of transmitting the packet to each device" is selected. The "Notification subtype" complements the "Notification type" and defines, for example, a method of identifying a device. The "Source information" indicates the product name and the version number of the source device from which the packet is transmitted and the name and the version number of the operating system (OS) installed in the source device. The "Device type" indicates the type of the device, for example, a media player, a server, a display device, or a remote controller. The type indicating the function of each device on the network is also included in the "Device type" in the operation according to the present embodiment. Referring back to FIG. 5, if the parent camera 1 determines in Step S501 that the notification packet 701 is received, the process goes to Step S504. If the parent camera 1 determines in Step S501 that the notification packet 701 is not received, the process goes to Step S502.

In Step S502, the parent camera 1 transmits a search packet to search for any child camera that is to participate in the slide show. For example, the parent camera 1 does not transmit the notification packet 701 to the digital camera, among the digital cameras 101 to 103 in FIG. 3, which is not activated as the child camera. Accordingly, the parent camera 1 does not recognize the digital camera to which the notification packet 701 is not transmitted as the child camera. The parent camera 1 transmits the search packet in order to cause the digital camera that is not recognized as the child camera to participate in the slide show.

The search packet is used to indicate that the parent camera 1 searches for the child camera. FIG. 8A illustrates an example of the search packet according to the present embodiment. A search packet 702 includes pieces of information "Packet type", "Destination", "Search type", "Waiting time", and "Search target". The "Search type" indicates the type of the search. The "Waiting time" indicates the maximum waiting time of a response to the notification of the search. The parent camera 1 continues to search for the child camera within the "Waiting time". The "Search target" identifies the devices to be searched for. For example, all the devices, the root device, a certain device, a device (devices) of a certain type, or a device (devices) having a certain service is specified as the "Search target". The parent camera 1 describes the type of the device to be searched for in the "Search target" field in the search packet 702. For example, according to the present embodiment, the parent camera 1 describes a server device and a display device that process video and audio and that are necessary for the slide show operation in the "Search target" field, thereby specifying and searching for the devices necessary for the slide show.

Referring back to FIG. 5, in Step S503, the parent camera 1 determines whether a search response packet is received. The search response packet is transmitted from the child camera in response to the search packet transmitted by the parent camera in Step S502. FIG. 8B illustrates an example of the search response packet according to the present embodiment. A search response packet 703 includes pieces of information "Packet type", "Validity period", "Search type to be responded to", "URL of device information", "Source information", "Search target", and "Device type". The "Validity period" indicates a time period during which the responding device exists as the device of the corresponding type on the network, that is, indicates the validity period of the function of the device. The "Search type to be responded to" indicates the search type to be responded to. If the search response packet 703 is not received within a predetermined time, the process goes back to Step S501 to repeat the above steps. If the parent camera 1 determines in Step S501 that the notification packet 701 is received or determines in Step S503 that the search response packet 703 is received, the process goes to Step S504.

In Step S504, the parent camera 1 refers to the "Device type" field of the notification packet 701 received in Step S501 or of the search response packet 703 received in Step S503 to confirm the information about the source device from which the packet is transmitted.

In Step S505, the parent camera 1 determines whether the source device confirmed in Step S504 is required for a desired operation. Specifically, the parent camera 1 determines whether the source device from which the packet is transmitted is the server device or the display device that is required for the slide show operation and that processes video and audio. If the parent camera 1 determines that the source device is required for the operation of the parent camera 1, the parent camera 1 stores the URL of the device information included in the search response packet 703 or the notification packet 701 and the process goes to Step S506. If the parent camera 1 determines that the source device is not required for the operation of the parent camera 1, the process goes back to Step S501 to repeat the above steps until the device required for the operation of the parent camera 1 is detected. For example, the process does not go to Step S506 in the case of a device, such as an audio player, playing back audio data that is not attached to video data because the device is not required for the slide show operation to display the images. According to the present embodiment, the parent camera 1 does not perform the control for a device of the type that is not required for the slide show operation.

Figure 9A:
FIGS. 9A and 9B illustrate examples of other packets according to the first exemplary embodiment.

In Step S506, the parent camera 1 transmits a device-information-request packet to the device the device information of which is confirmed in Step S505. The device-information-request packet is transmitted from the parent camera to the child camera and is used to request detailed information about the device and/or the services provided by the device. The services include "transfer of a file list", "transmission of a file", "display of a still image", "playback of a moving image", "playback of music", and "printing of a still image". FIG. 9A illustrates an example of the device-information-request packet according to the present embodiment. A device-information-request packet 704 includes pieces of information "Packet type" and "Destination". The device information is requested on the basis of the URL of the device information stored in Step S505. The digital cameras 101 to 103, which are the child cameras in FIG. 3, returns necessary device information in response to this request.

Figure 9B:
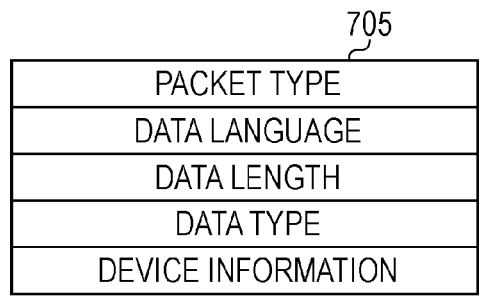

In Step S507, the parent camera 1 determines whether a device-information packet is received. The device-information packet is transmitted by the child camera in response to the device-information-request packet 704 transmitted from the parent camera. FIG. 9B illustrates an example of the device-information packet according to the present embodiment. A device-information packet 705 includes pieces of information "Packet type", "Data language", "Data length", "Data type", and "Device information". The "Data language" indicates the kind of the language used by the own device in the communication of information between the devices. The "Data length" indicates the size of data in the "Device information". The "Data type" indicates the data type of the "Device information". The "Device information" indicates information about the device, including the device name, the serial number, and the services that the device can provide. If the parent camera 1 determines in Step S507 that the device-information packet 705 is not received within a predetermined time, the process goes back to Step S506 and the parent camera 1 transmits the device-information-request packet 704. If the parent camera 1 determines in Step S507 that the device-information packet 705 is received, the process goes to Step S508.

In Step S508, the parent camera 1 refers to the device information described in the device-information packet 705 to confirm the detailed information about the source device and the services that the source device can provide. According to the present embodiment, the device name of the child camera and the list of the services that the child camera provides are described in the "Device information" field in the device-information packet 705 received from the child camera. The services include "transfer of a file list", "transmission of a file", "display of a still image", "playback of a moving image", "playback of music", and "printing of a still image".

Figure 10A:
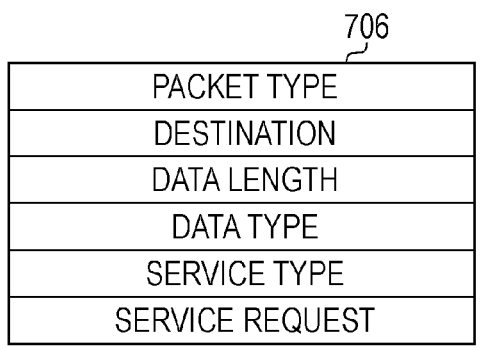
FIGS. 10A and 10B illustrate examples of other packets according to the first exemplary embodiment.

In Step S509, the parent camera 1 determines whether the service confirmed in Step S508 is the desired service. If the parent camera 1 determines that the service is not desired, for example, if only the functions, such as the "playback of music" and the "printing of a still image", are provided as the services, the operation is terminated. If the parent camera 1 determines that the service is desired, the parent camera 1 stores the information including the device name in the device-information packet 705. In Step S510, the parent camera 1 transmits a service-request packet. The service-request packet is transmitted from the parent camera to the child camera to request a desired service. FIG. 10A illustrates an example of the service-request packet according to the present embodiment. A service-request packet 706 includes pieces of information "Packet type", "Destination", "Data length", "Data type", "Service type", and "Service request". The "Service type" indicates information including the data format based on the content of the services. The "Service request" indicates the content of the services that are actually requested and includes "transfer of a file list", "transmission of a file", and "playback". The "Service request" also includes detailed information indicating the names and identifications (IDs) of files that are the targets for the services. For example, in order to perform the slide show in the system, it is necessary for the parent camera 1 to acquire attribute information about images held in the multiple child cameras. In this case, a service for "transmitting a list of the sizes, IDs, titles, and shooting dates and times of the images held in the child cameras" is described in the service-request packet 706. The description in the service-request packet 706 can be varied to request various services. For example, a service for "transmitting a list of sizes, IDs, titles, and shooting dates and times of the images captured within a predetermined period, among the images held in the child cameras" can be written in the "Service request" field in the service-request packet 706 to request the service. Accordingly, the parent camera can control the child camera so as to transmit the attribute information about the images meeting a certain search condition. The content of the services is not restricted. For example, the parent camera may cause the child camera to transmit the images themselves.

Figure 10B:
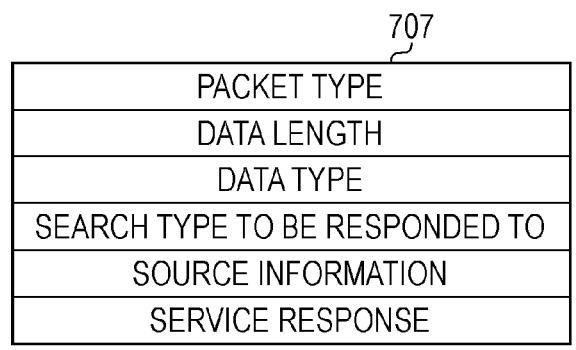

In Step S511, the parent camera 1 determines whether a service response packet is received. The service response packet is transmitted from the child camera in response to the service-request packet 706 transmitted from the parent camera in Step S510. FIG. 10B illustrates an example of the service response packet according to the present embodiment. A service response packet 707 includes pieces of information "Packet type", "Data length", "Data type", "Search type to be responded to", "Source information", and "Service response". The "Service response" indicates actual data on the service to be responded to, that is, indicates the data that is requested. If the service response packet 707 is not received within a predetermined time, the process goes back to Step S510 and the parent camera 1 transmits the service-request packet 706 again. If the parent camera 1 determines that the service response packet 707 is received, the process goes to Step S512. The service response packet 707 does not necessarily include the requested data. Information by which the actual data can be uniquely identified or data that is converted may be described in the service response packet 707.

In Step S512, the parent camera 1 stores the execution result of the received service in the memory 20 of the digital camera 1 and the operation is terminated.

As described above, the parent camera 1 receives the service response packet 707 from the child camera as the execution result of the service requested in Step S510. The service response packet 707 includes the execution result of the service, that is, the attribute information including the sizes, IDs, and titles of the images held in the child camera and the dates and times when the images are captured (the shooting dates and times). The image IDs may be any information with which the images can be identified. For example, the file names of the images or Universally Unique Identifiers (UUIDs) added to the images can be used as the image IDs. According to the present embodiment, the file names of the images are used as the image IDs. The parent camera 1 stores the above information in the memory 20 of the parent camera 1 as the slide show list. The child camera may generate the list of the above information and may transmit the list to the parent camera 1.

Figure 11:
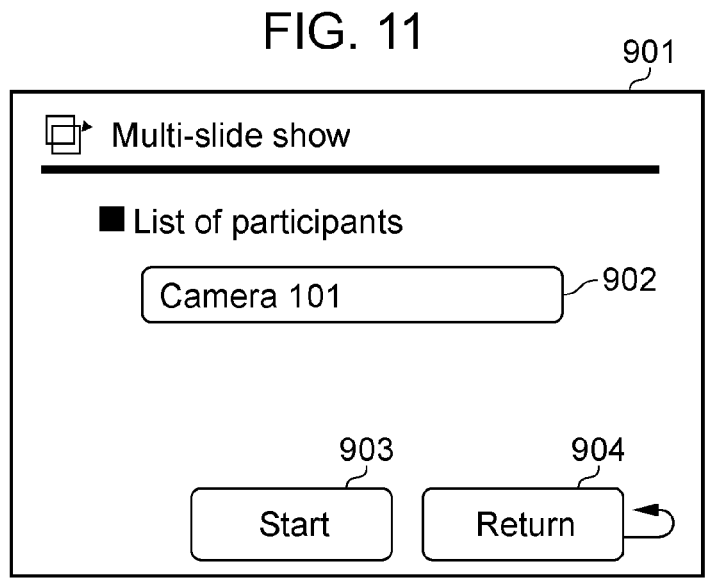
FIG. 11 illustrates a user interface in which a child camera detected by the parent camera is displayed according to the first exemplary embodiment.

FIG. 11 illustrates a user interface 901 displayed in the display unit 13 of the parent camera 1 when the parent camera 1 acquires the attribute information about the images held in the child camera in Step S511. After acquiring the list of the images, the parent camera 1 displays the device name that is extracted from the "Device information" field of the device-information packet 705 and that is stored in Step S509. In the user interface 901 illustrated in FIG. 11, an icon 902 indicates that the parent camera 1 has acquired the list of the images held in the digital camera 101. When the user selects a "Start" icon 903, the slide show is started on the basis of the attribute information about the acquired images. When the user selects a "Return" icon 904, the operation as the parent camera 1 is stopped.

The operation of the parent camera 1 is described with reference to FIG. 5. Next, the operations of the devices that are controlled on the network, that is, the operation of the digital cameras 101 to 103 and the television set 201 will now be described.

Figure 6:
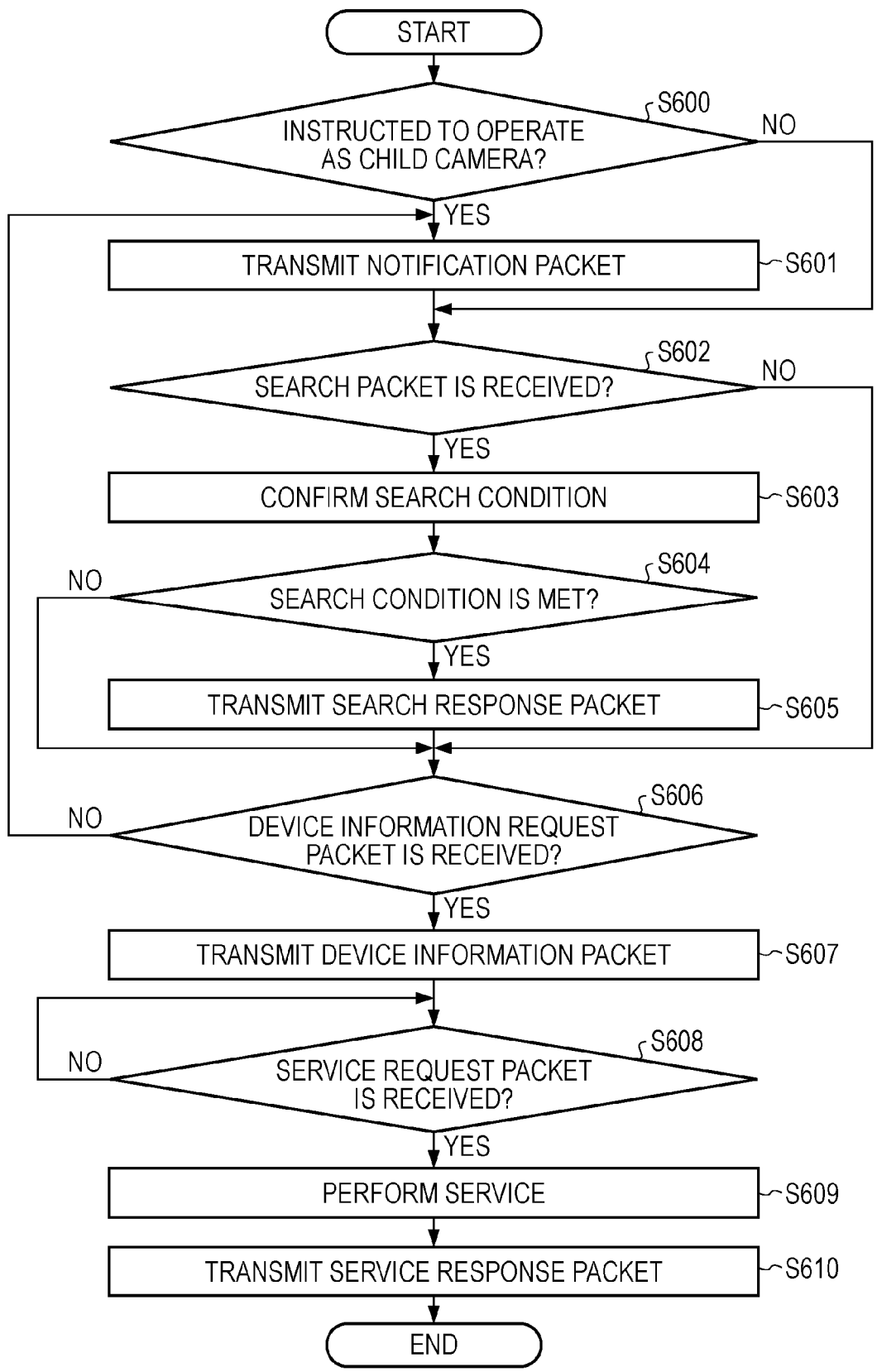
FIG. 6 is a flowchart showing an example of an operation of a child camera according to the first exemplary embodiment.

FIG. 6 is a flowchart showing an example of the operation of the devices controlled on the network. According to the present embodiment, the following operation is realized by the system control circuit 9 of the digital camera 101 or the system controller 207 of the television set 201 that controls the components. The device controlled on the network is exemplified by the child camera 101, unless otherwise specified.

Referring to FIG. 6, in Step S600, the child camera 101 determines whether the user instructs the child camera 101 to serve as the device controlled on the network. Specifically, the child camera 101 determines whether the user selects the "Participate in multi-slide show" on the user interface 401 illustrated in FIG. 4. If the child camera 101 determines that the user instructs the child camera 101 to serve as the device controlled on the network, the process goes to Step S601. If the child camera 101 determines that the user does not instruct the child camera 101 to serve as the device controlled on the network, the process goes to Step S602.

In Step S601, the child camera 101 creates the notification packet including information about the type of the own device and multicasts the notification packet to the network to which the child camera 101 is currently connected. For example, the child camera 101 indicates in the "Device type" field in the notification packet 701 that the child camera 101 is a server device processing video and audio. The television set 201 indicates in the "Device type" field in the notification packet 701 that the television set 201 is a display device capable of displaying video and audio. Then, the child camera 101 or the television set 201 transmits the notification packet 701 to the devices on the network.

In Step S602, the child camera 101 determines whether the search packet 702 is received from the parent camera. The determination is performed because the child camera can receive the search packet 702 from the parent camera 1 after transmitting the notification packet 701. If the child camera 101 determines that the search packet 702 is received, the process goes to Step S603. If the child camera 101 determines that the search packet 702 is not received, the process goes to Step S606.

In Step S603, the child camera 101 refers to the content of the "Search target" field in the search packet 702 to confirm the search condition specified by the parent camera.

In Step S604, the child camera 101 determines whether it meets the search condition. If the child camera 101 determines that it meets the search condition, the process goes to Step S605. If the child camera 101 determines that it does not meet the search condition, the process goes to step S606 without transmitting any response.

In Step S605, the child camera 101 transmits the search response packet 703 including information about the type of the own device to the source device from which the search packet 702 is transmitted. For example, if it is determined in Step S604 that the search packet 702 is targeted for the server device processing video and audio, the child camera 101 responds to the search packet 702 because the child camera 101 is a server device processing video and audio. Specifically, the child camera 101 describes the type of the own device in the "Device type" field in the search response packet 703 and transmits the search response packet 703 to the parent camera 1. In the case of the television set 201, if it is determined in Step S604 that the search packet 702 is targeted for the display device capable of displaying video and audio, the television set 201 transmits the search response packet 703 to the parent camera 1.

In Step S606, the child camera 101 determines whether the device-information-request packet 704 is received. If the device-information-request packet 704 is not received within a predetermined time, the process goes back to Step S601. If the child camera 101 determines that the device-information-request packet 704 is received, the process goes to Step S607.

In Step S607, the child camera 101 describes detailed information about the own device and the services that the own device can provide in the device-information packet 705 and transmits the device-information packet 705 to the device from which the device-information-request packet 704 is transmitted.

In Step S608, the child camera 101 determines whether the service-request packet 706 is received. If the child camera 101 determines that the service-request packet 706 is received, the process goes to Step S609. If the child camera 101 determines that the service-request packet 706 is not received, the child camera 101 waits for the reception of the service-request packet 706.

In Step S609, the child camera 101 performs the service requested in the service-request packet 706. In Step S610, the child camera 101 transmits the execution result of the service, as the service response packet 707, to the device from which the service-request packet 706 is transmitted.

For example, the request for information about the images held in the child camera is described in the "Service request" field in the service-request packet 706. The child camera refers to the description to perform the process corresponding to the request. The child camera describes the list of the attribute information including the sizes, IDs, titles, and shooting dates and times of the images stored in the own device in the "Service response" field in the service response packet 707 and transmits the service response packet 707 to the parent camera 1. The search condition, such as the specification of the shooting dates and times of the images, may be specified in the "Service request" field in the service-request packet 706. In this case, the child camera 101 searches for the images meeting the search condition from the images stored in the child camera 101. The child camera 101 describes the list of the attribute information about the images meeting the search condition in the "Service response" field in the service response packet 707 and transmits the service response packet 707 to the parent camera 1. The attribute information is not restricted to the one described above and may be, for example, attribute information included in an image file conforming to Exchangeable Image File Format (Exif).

As described above, in the network system according to the present embodiment, the parent camera 1 can request the information about the images from the child cameras. The execution of the service by the child cameras allows the parent camera 1 to acquire the attribute information about the images held in the multiple child cameras on the network. The attribute information includes the sizes, IDs, titles, and shooting dates and times of the images. The parent camera 1 associates each piece of the attribute information with the ID of the child camera to generate the slide show list on the network. The parent camera 1 may store the images captured by the own device in the memory card 30 of the own device. If the parent camera 1 stores the images captured by the own device, the parent camera 1 may add the attribute information about the images stored in the own device to the generated slide show list to update the list of the images (image list).

Figures 12, 13:
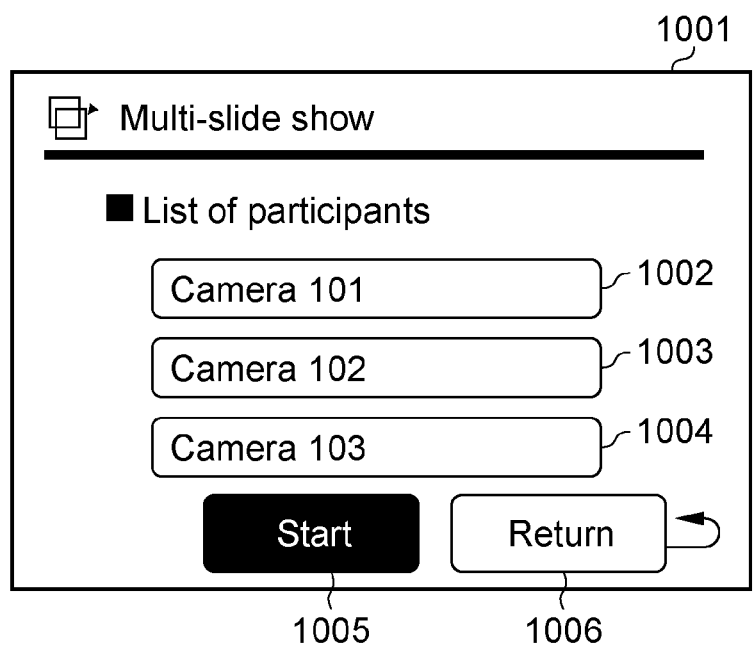
FIG. 12 illustrates an example of a slide show list according to the first exemplary embodiment.
FIG. 13 illustrates a user interface in which multiple child cameras detected by the parent camera are displayed according to the first exemplary embodiment.

The parent camera 1 may arrange the display order of the generated slide show list and may rearrange the images in the slide show list in an arbitrary order. For example, the parent camera 1 may rearrange the images in time series by using the shooting dates and times as keys to generate a slide show list illustrated in FIG. 12. FIG. 12 illustrates the slide show list when the digital camera 1, which is the parent camera, collects information about the images held in the child cameras 101 to 103 on the network. The slide show list in FIG. 12 is rearranged in time series by using the shooting dates and times as the keys. The slide show list is characterized in that all the images held in the multiple devices on the network are arranged in time series regardless of which camera each image is stored. Accordingly, it is possible to perform the slide show of all the images stored in the multiple digital cameras in time series.

Although the images are rearranged in time series to generate the slide show list in the present embodiment, the images may be rearranged on the basis of the attribute information, instead of the time series. For example, the parent camera 1 may rearrange the images in order of the latitudes and longitudes thereof on the basis of positional information in the service-request packet 706. Alternatively, the parent camera 1 may request only the images captured in a certain shooting mode (for example, only the images captured in a portrait mode) from the child camera to generate a slide show list corresponding to the request.

FIG. 13 illustrates a user interface 1001 displayed in the display unit 13 of the parent camera 1 when the parent camera 1 acquires the attribute information about the images held in the child cameras 101 to 103 on the network in FIG. 3. Information about the child cameras is indicated as icons 1002 to 1004. When the user selects a "Start" icon 1005, the parent camera 1 starts the slide show on the network on the basis of the slide show list 801 that is generated. When the user selects a "Return" icon, 1006, the parent camera 1 stops the slide show. The operation of the slide show will be described in detail below.

Slide Show

Figure 14:
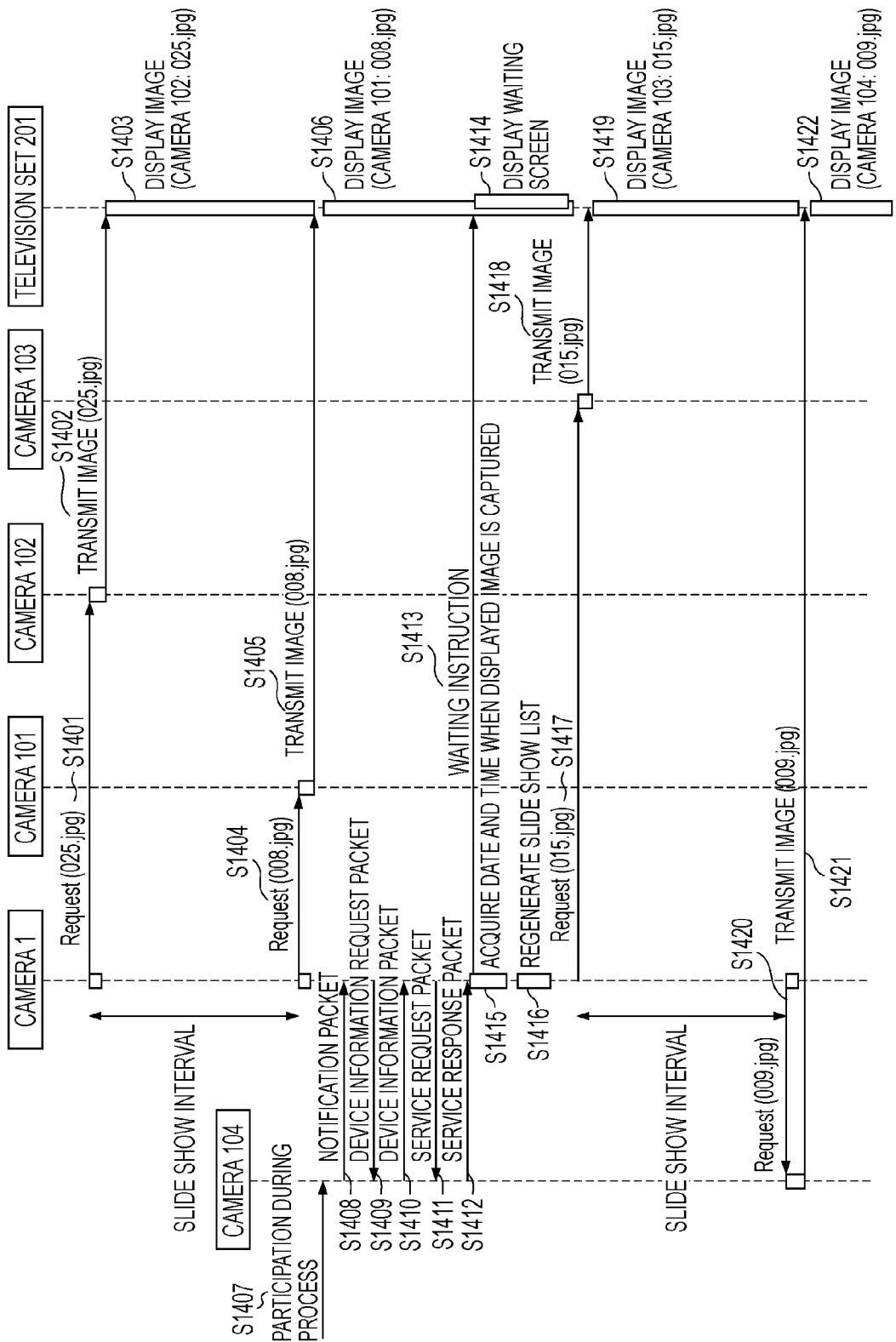
FIG. 14 is a sequence chart illustrating a process according to the first exemplary embodiment.

FIG. 14 is a sequence chart illustrating a process according to the present embodiment. The following description is based on this sequence chart.

Figure 15:
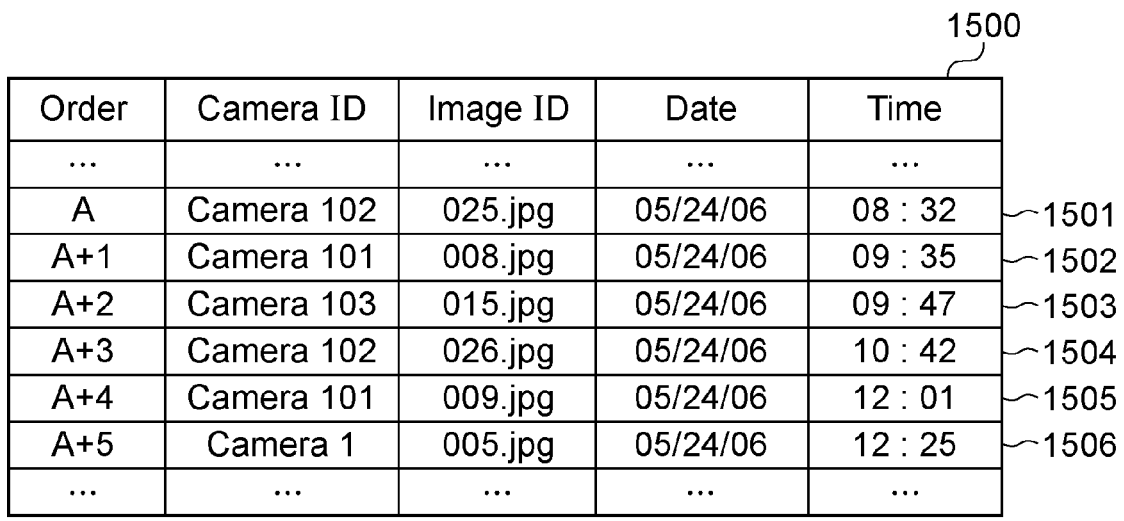
FIG. 15 illustrates an image information list according to the first exemplary embodiment.

Referring to FIG. 14, the digital camera 1 is the parent camera according to the present embodiment and controls the display of the images held in the child cameras 101 to 103 on the basis of the slide show list 801 that is generated. FIG. 15 illustrates a slide show list 1500 at a certain time point during the slide show. It is assumed that a child camera 104 does not participate in the slide show at this time point.

The parent camera 1 reads out an order A (indicated in a row 1501) in the slide show list 1500 to acquire the camera ID and image ID. In the slide show list 1500 in FIG. 15, the camera ID is "Camera 102" and the image ID is "025.jpg" in the row 1501. Referring to FIG. 14, in Step S1401, the parent camera 1 transmits a display request packet to the child camera 102. The display request packet includes an instruction to transmit the image having the image ID "025.jpg" to the television set 201 and to display the image in the television set 201.

In Step S1402, the child camera 102 receives the display request packet. The child camera 102 reads out the image corresponding to the image ID included in the display request packet from the memory card 30 and transmits the readout image to the television set 201. The television set 201 receives the image transmitted from the child camera 102.

In Step S1403, the television set 201 displays the received image in the display unit 203.

When a slide show interval set in advance as the display time of one image elapsed, the parent camera 1 reads out an order A+1 (indicated in a row 1502) in the slide show list 1500. As in the order A (in the row 1501), in Step S1404, the parent camera 1 transmits the display request packet to the child camera 101.

In Step S1405, the child camera 101 transmits the image specified in the display request packet to the television set 201.

In Step S1406, the television set 201 displays the image in the display unit 203.

The above operation is repeated for each image in the slide show list 1500 and the images are sequentially displayed in the television set 201, thereby realizing the slide show.

Although the parent camera 1 transmits the display request packet to the child camera and the child camera transmits the image to the television set 201 in response to the display request packet in the present embodiment, the parent camera 1 may transmit the image ID and the camera ID that is to be subjected to the slide show next to the television set 201. In this case, the television set 201 transmits a packet for requesting an image to be displayed to the child camera on the basis of the image ID and the camera ID received from the parent camera 1. The child camera transmits the image to the television set 201 in response to the packet.

The basic operation of the slide show is described above. Next, a case will now be described where a new child camera participates in the network while the parent camera 1 controls the slide show. The parent camera 1 regenerates the slide show list to rearrange the display order of the slide show.

Referring to FIG. 14, in Step S1407, the child camera 104, which is a new image-processing device, participates in the network after the processing of the order A+1 (in the row 1502) in the slide show list 1500 in FIG. 15 is completed. The detection process of the child camera 104 and the collection process of the image information (Step S1408 to Step S1412) are performed in the same manner as in FIGS. 5 and 6. The notification packet 701 transmitted from the child camera 104 is received during the slide show to detect the child camera 104.

Figure 16:
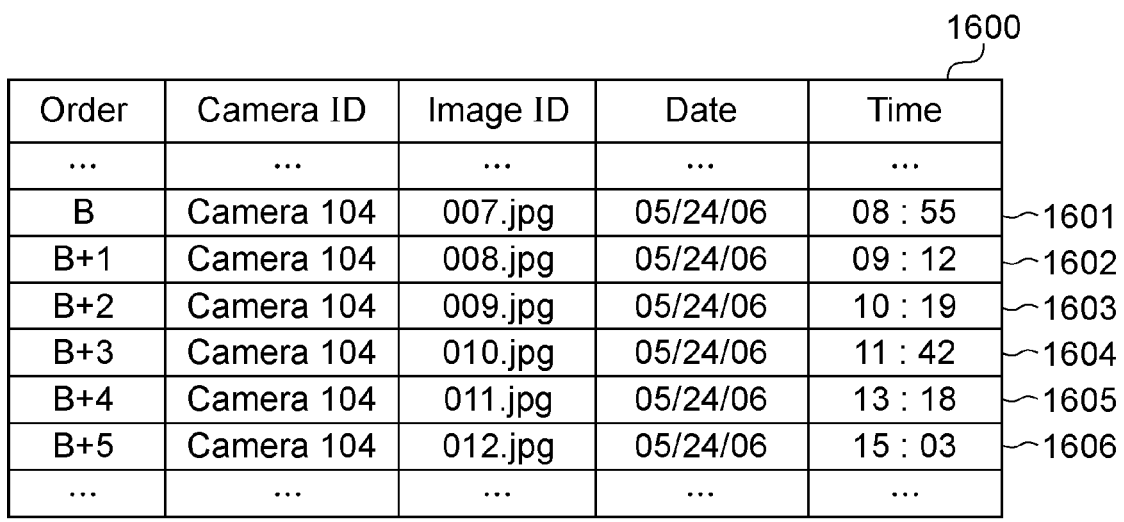
FIG. 16 illustrates another image information list according to the first exemplary embodiment.

FIG. 16 illustrates an image list 1600 indicating the images stored in the memory card 30 of the child camera 104.

After acquiring the image list 1600 of the child camera 104, in Step S1413, the parent camera 1 transmits a waiting instruction packet to the television set 201.

Figures 17, 18:
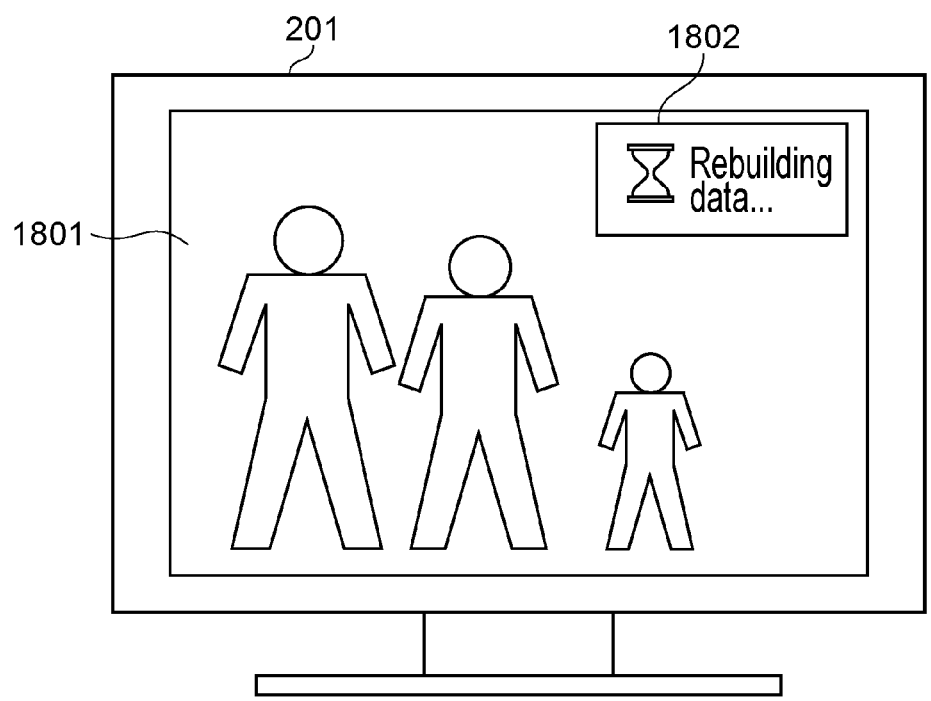
FIG. 17 illustrates another image information list according to the first exemplary embodiment.
FIG. 18 illustrates a display screen according to the first exemplary embodiment.

In Step S1414, the television set 201 receives the waiting instruction packet and displays a waiting screen 1801 illustrated in FIG. 18.

Referring to FIG. 18, the waiting screen 1801 is displayed immediately before the waiting instruction packet is received. According to the present embodiment, the image of the order A+1 (in the row 1502), that is, the image of the child camera 101 (008.jpg) is displayed in the waiting screen 1801. A waiting instruction message 1802 is displayed in an upper part of the waiting screen 1801. The user can read the waiting instruction message 1802 to recognize that the parent camera 1 is regenerating the slide show list.

In Step S1415, the parent camera 1 acquires display information. Specifically, the parent camera 1 refers to the slide show list 1500 to acquire the shooting date and time of the image that is currently displayed, that is, of the image that is displayed when the slide show is paused. The image that is currently displayed corresponds to the order A+1 (in the row 1502) in the slide show list 1500. Accordingly, the parent camera 1 stores the shooting date and time of the image, "05/24/06 09:35", in the non-volatile memory 22.

In Step S1416, the parent camera 1 uses the slide show list 1500 that is currently performed, the image list 1600 of the child camera 104, and the shooting date and time of the image currently displayed, acquired in Step S1415, to regenerate a slide show list.

How the slide show list is regenerated will now be described in detail. According to the present embodiment, the new slide show includes the images captured after the shooting date and time of the image currently displayed acquired in Step S1415, among the images in the slide show list 1500 and the image list 1600 of the child camera 104. Specifically, the images of an order B+2 (indicated in a row 1603) and the subsequent orders, which are captured after "05/24/06 09:35", in the image list 1600 of the child camera 104 are included in the slide show. The images in rows 1601 and 1602 captured before "05/24/06 09:35" are not included in the slide show.

FIG. 17 illustrates a slide show list 1700 that is regenerated. The images captured after "05/24/06 09:35", among the images in the slide show list 1500 and the image list 1600, are included in the slide show list 1700. The parent camera 1 rearranges the images in the order of the shooting date and time and stores the images in the non-volatile memory 22 as the slide show list 1700. The images captured after "05/24/06 09:35", among the images in the slide show list 1500, were not displayed in the slide show before the slide show is paused.

The regeneration of the slide show list in the above manner allows the slide show to continue without interrupting the flow of the slide show that has been played back in time series.

According to the present embodiment, the shooting date and time "05/24/06 09:35" of the image currently displayed is acquired in Step S1415 and it is determined whether the images are included in the slide show list to be regenerated by using the shooting date and time as a threshold value. However, the images that are captured a little before the shooting date and time of the image currently displayed, among the images in the image list 1600, have a higher relevance to the image currently displayed. Accordingly, the threshold value may be increased to some extent.

For example, it is assumed that the threshold value is set to one hour. The threshold value may be set by the user. Alternatively, the setting of the threshold value may be stored in the non-volatile memory 22 of the parent camera 1.

In this case, the images captured at and after 08:35 on May 24, 2006 which is one hour before the shooting date and time acquired in Step S1415, among the images in the image list 1600, are also included in the slide show based on the slide show list to be regenerated. Accordingly, it is possible for the user to view the images captured a little before the image that has been displayed when the slide show is paused.

Although the images in the slide show list are rearranged in the order of the shooting date and time and the shooting dates and times are used as the attribute information acquired in Step S1415, the shooting position information or the shooting modes may be used as the attribute information, instead of the time information. The shooting modes are used to set shooting parameters optimal for the situations at the shooting. For example, the shooting modes include a "portrait mode" in which parameters optimal for shooting persons are automatically selected and a "landscape mode" in which landscape images are captured.

For example, when the shooting position information is used as the attribute information, the images are arranged in the ascending order of the distances to a point set by the parent camera 1 in the active slide show list 1500.

In this case, the parent camera 1 acquires the shooting position information about the image that is being displayed in Step S1415.

The parent camera 1 selects the images to be included in the slide show on the basis of the shooting position information in Step S1416. The parent camera 1 rearranges the selected images on the basis of the shooting position information to regenerate the slide show list.

When the shooting modes are used as the attribute information, the images are arranged in units of the shooting modes, such as the "portrait mode", the "landscape mode", and a "nightscape mode", in the active slide show list 1500.

In this case, the parent camera 1 acquires the shooting mode information about the image that is being displayed in Steps S1415.

The parent camera 1 selects the images to be included in the slide show on the basis of the shooting mode information in Step S1416. The parent camera 1 rearranges the selected images on the basis of the shooting mode information to regenerate the slide show list.

A process performed after the slide show list is regenerated will now be described. After the regeneration of the slide show list is finished in Step S1416 and the new slide show list 1700 is generated, the parent camera 1 restarts to control the display of the slide show.

The parent camera 1 reads out the first image indicated in a row 1701 from the slide show list 1700 to acquire the camera ID and the image ID. The camera ID in the row 1701 is "Camera 103" and the image ID is "015.jpg". Accordingly, referring back to FIG. 14, in Step S1417, the parent camera 1 transmits the display request packet including the image ID "015.jpg" to the child camera 103.

After receiving the display request packet, in Step S1418, the child camera 103 reads out the image specified in the display request packet from the memory card 30 and transmits the readout image to the television set 201.

After receiving the image from the child camera 103, in Step S1419, the television set 201 displays the received image in the display unit 203.

When the slide show interval elapsed, the parent camera 1 reads out the next image indicated in a row 1702 from the slide show list 1700.

In Step S1420, the parent camera 1 transmits the display request packet to the child camera 104.

In Step S1421, the child camera 104 transmits the image specified in the display request packet to the television set 201. In Step S1422, the television set 201 displays the image in the display unit 203.

Although one child camera participates in the slide show while the slide show is performed in the present embodiment, multiple child cameras may participate in the slide show while the slide show is performed. In this case, the parent camera 1 acquires multiple lists of images held in the child cameras that participate in the slide show while the slide show is performed. The parent camera 1 uses the image lists acquired from the multiple child cameras, the active slide show list, and the attribute information about the image that is currently displayed to regenerate a slide show list.

A new image-processing device is permitted to participate in the slide show while the slide show is performed without condition in the present embodiment. Although the slide show can be smoothly continued even if a new device participates in the slide show in the present embodiment, it takes some time to regenerate the slide show list on which the slide show is based. Accordingly, the parent camera 1 may reject the participation of the new child camera in response to a certain operation of the user with the operation unit 25 of the parent camera 1 or any of the child cameras 101 to 103 while the waiting screen 1801 in FIG. 18 is being displayed and may continue the slide show that is paused.

In addition, after the slide show list is regenerated and the slide show based on the regenerated slide show list is completed, the slide show may be performed again from the beginning. For example, after the slide show is completed, the parent camera 1 controls the television set 201 so as to display a menu with which the user selects the re-performance of the slide show from the beginning. When the user instructs the re-performance of the slide show from the beginning, the parent camera 1 performs the slide show from the beginning.

In this case, the parent camera 1 regenerates the slide show list including the images that are not included in the slide show list in Step S1416. For example, the parent camera 1 regenerates a new slide show list including the images in the rows 1601 and 1602 in FIG. 16.

With the above process, the user of the child camera 104 who participates in the network during the slide show can view the images which the user missed. The user who originally participates in the slide show can view the images that are held in the child camera 104 and that have not been played back in the first slide show.

If the operation of the slide show is set to a repeat playback mode in which the slide show is repeatedly performed, the parent camera 1 may regenerate the slide show list including the images held in all the devices including the child camera 104 in Step S1416.

In this case, the parent camera 1 refers to the new slide show list including all the images to restart the slide show from the image having the attribute information acquired in Step S1415. After the playback of the slide show is completed, the parent camera 1 starts the slide show from the beginning. With this step, it is possible to smoothly perform the repeat playback.

In the repeat playback, the display may be controlled so as to discriminate between the images that have been displayed in the first slide show and the images that have not been displayed yet. In this case, the parent camera 1 discriminates the images which are captured before the image that is currently displayed and that is acquired in Step S1415 and whose camera IDs are of the child camera that newly participates in the network from the other images and displays the discriminated images. For the discrimination, for example, icons may be displayed. The icons may be added to the images which the child cameras transmit or may be added to the images received by the television set 201.

As described above, according to the present embodiment, the image list of a new device is merged with the slide show list that is currently performed even if the new device participates in the network during the slide show. With this step, the consistency in the display order of the images can be kept even if a change in the configuration of the devices on the network occurs. Accordingly, it is possible to smoothly continue the slide show without causing discomfort to the user.

Second Exemplary Embodiment

A second exemplary embodiment of the present invention will now be described.

The case where the new device participates in the network during the slide show is described in the first exemplary embodiment of the present invention. In contrast, an operation performed when a device is separated, or disconnected from the network during the slide show is described in the second exemplary embodiment of the present invention.

A description of parts common to the first exemplary embodiment is not repeated and parts specific to the second exemplary embodiment are mainly described.

Figure 19:
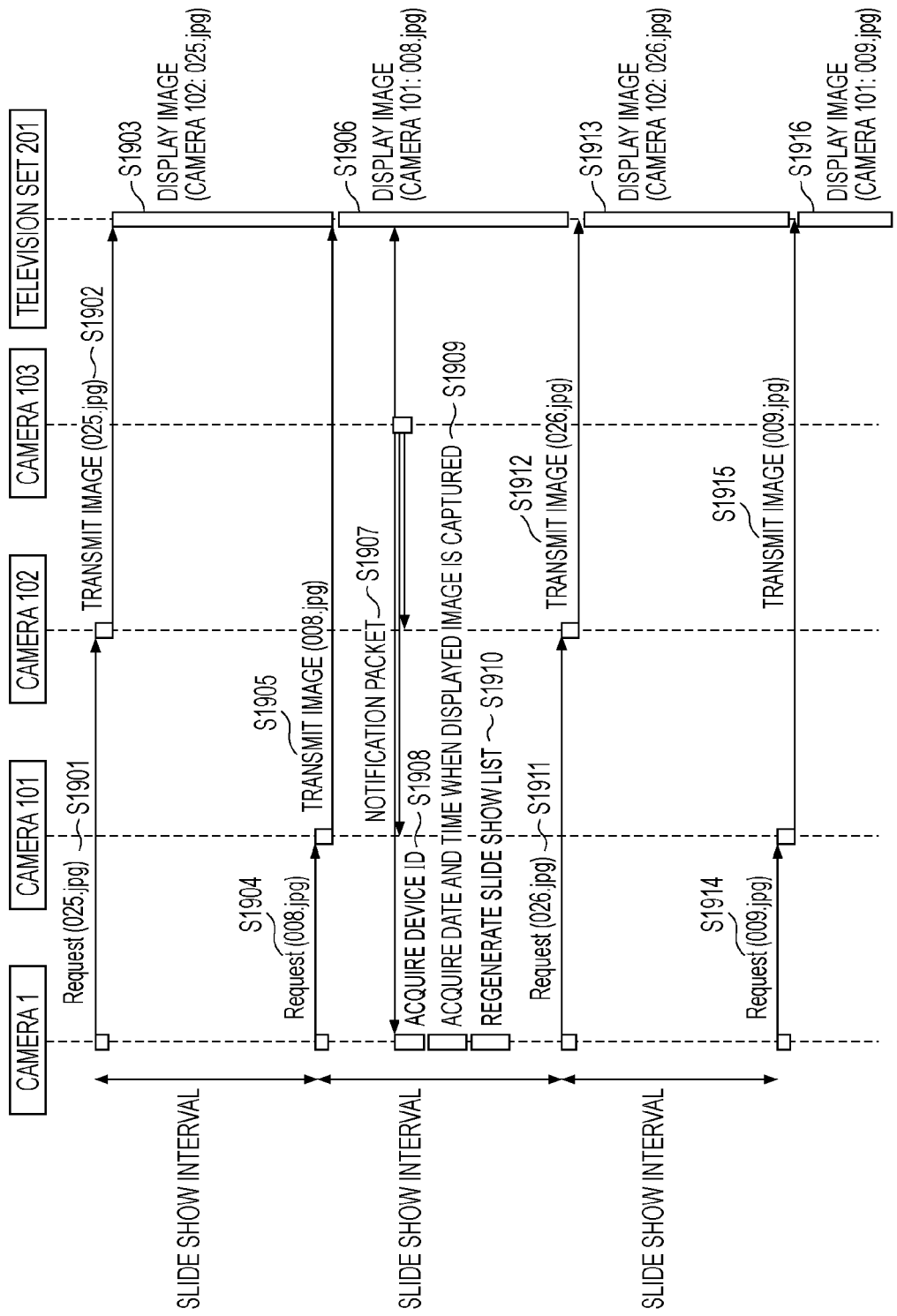
FIG. 19 is a sequence chart illustrating a process according to a second exemplary embodiment.

FIG. 19 is a sequence chart illustrating a process according to the present embodiment. FIG. 20 illustrates a slide show list 2000 at a certain time point during the slide show.

Since Steps S1901 to S1906 in FIG. 19 are similar to Steps S1401 to S1406 in FIG. 14, a description of Steps S1901 to S1906 is not included herein.

Step S1907 and the subsequent steps are described with reference to FIG. 19. According to the present embodiment, a case is described where the child camera 103 is separated from the network at a time point when the slide show has been performed up to the image corresponding to an order A+1 indicated in a row 2002 in the slide show list 2000.

In Step S1907, the child camera 103 notifies the devices around the child camera 103 of the separation of the child camera 103 from the network. Specifically, the child camera 103 multicasts the notification packet 701 in which information indicating the separation from the network is described in the "Notification subtype" field.

In Step S1908, the parent camera 1 receives the notification packet 701 from the child camera 103 and acquires the device ID from the "Device type" field in the received notification packet 701. The parent camera 1 refers to the acquired camera ID to detect that the child camera 103 has been separated from the network.

In Step S1909, the parent camera 1 acquires the shooting date and time of the image currently displayed from the slide show list 2000. Step S1909 is similar to Step S1415 in FIG. 14. Since the image currently displayed corresponds to the order A+1 in the row 2002 in the slide show list 2000, the parent camera 1 stores the shooting date and time "05/24/06 09:35" in the non-volatile memory 22.

In Step S1910, the parent camera 1 regenerates a slide show list. Specifically, the parent camera 1 uses the active slide show list 2000, the camera ID of the child camera 103, whose separation from the network is detected in Step S1908, and the shooting date and time of the image currently displayed acquired in Step S1909 to regenerate a slide show list.

The regeneration of the slide show list according to the present embodiment will now be described in detail. The parent camera 1 includes the images other than the images having the camera ID of the child camera 103 which has separated from the network, among the images in the active slide show list 2000, in the new slide show. FIG. 21 illustrates a slide show list 2100 that is regenerated.

The regeneration of the slide show list in the above manner allows the images held in the child camera 103 to be excluded from the target images of the slide show after the child camera 103 is separated from the network.

After the regeneration of the slide show list in Step S1910 is finished and the new slide show list 2100 is completed, the parent camera 1 restarts to control the display of the slide show.

The parent camera 1 reads out the image that is first captured, among the images captured after "05/24/06 9:35" in the slide show list 2100, to acquire the camera ID and the image ID. According to the present embodiment, the parent camera 1 reads out the image corresponding to an order 3 in a row 2103 in the slide show list 2100. The camera ID in the row 2103 is "Camera 102" and the image ID therein is "026.jpg". Accordingly, in Step S1911, the parent camera 1 transmits the display request packet to request the display of the image having the image ID "026.jpg" to the child camera 102.

After receiving the display request packet, in Step S1912, the child camera 102 reads out the image specified in the display request packet from the memory card 30 and transmits the readout image to the television set 201.

After receiving the image from the child camera 102, in Step S1913, the television set 201 displays the received image in the display unit 203.

When the slide show interval elapsed, the parent camera 1 reads out the next image indicated in a row 2104 in the slide show list 2100. The camera ID in the row 2104 is "Camera 101" and the image ID therein is "009.jpg". In Step S1914, the parent camera 1 transmits the display request packet to the child camera 101. In Step S1915, the child camera 101 transmits the image specified in the display request packet to the television set 201.

In Step S1916, the television set 201 displays the image received from the child camera 101 in the display unit 203.

Although one child camera is separated from the network during the slide show in the present embodiment, multiple child cameras may be separated from the network. In this case, the parent camera detects the separation of each child camera from the network to regenerate the slide show list.

According to the present embodiment, as in the first exemplary embodiment, the parent camera 1 may control the television set 201 so as to display a menu with which the user selects the re-performance of the slide show from the beginning after the slide show is completed.

All the images having the camera ID of the child camera 103 are excluded from the slide show list 2000 to regenerate the slide show list in the present embodiment. However, the method of regenerating the slide show list is not restricted to the above one. For example, the parent camera 1 may select the images captured after "05/24/06 09:35", which is the shooting date and time of the image currently displayed, from the slide show list 2000 and may exclude the images having the camera ID of the separated child camera 103 from the selected images.

In the method of regenerating the slide show list described above, the images captured before "05/24/06 09:35" are not excluded from the new slide show even if the images have the camera ID of the child camera 103. Accordingly, when the slide show is performed again after the slide show is completed, the parent camera 1 regenerates a slide show list in which all the images having the camera ID of the child camera 103 are excluded.

In addition, the method of regenerating the slide show list may be switched on the basis of whether the operation of the slide show is set to the repeat playback mode. For example, if the operation of the slide show is set to the repeat playback mode, the parent camera 1 deletes all the images having the camera ID of the child camera 103 from the slide show list in Step S1910. If the operation of the slide show is not set to the repeat playback mode, the parent camera 1 includes the images captured after "05/24/06 09:35" in the new slide show.

As described above, according to the present embodiment, even if a device is separated from the network during the slide show, the images held in the separated device are excluded from the active slide show list to regenerate the slide show list. Accordingly, it is possible to smoothly continue the slide show without causing discomfort to the user.

Since the parent camera 1 does not request the images held in the device separated from the network from the child camera, it is possible to prevent any error or extra communication from occurring.

Third Exemplary Embodiment

A third exemplary embodiment of the present invention will now be described.

A description of parts common to the first exemplary embodiment is not repeated herein and parts specific to the third exemplary embodiment are mainly described.

Figure 22:
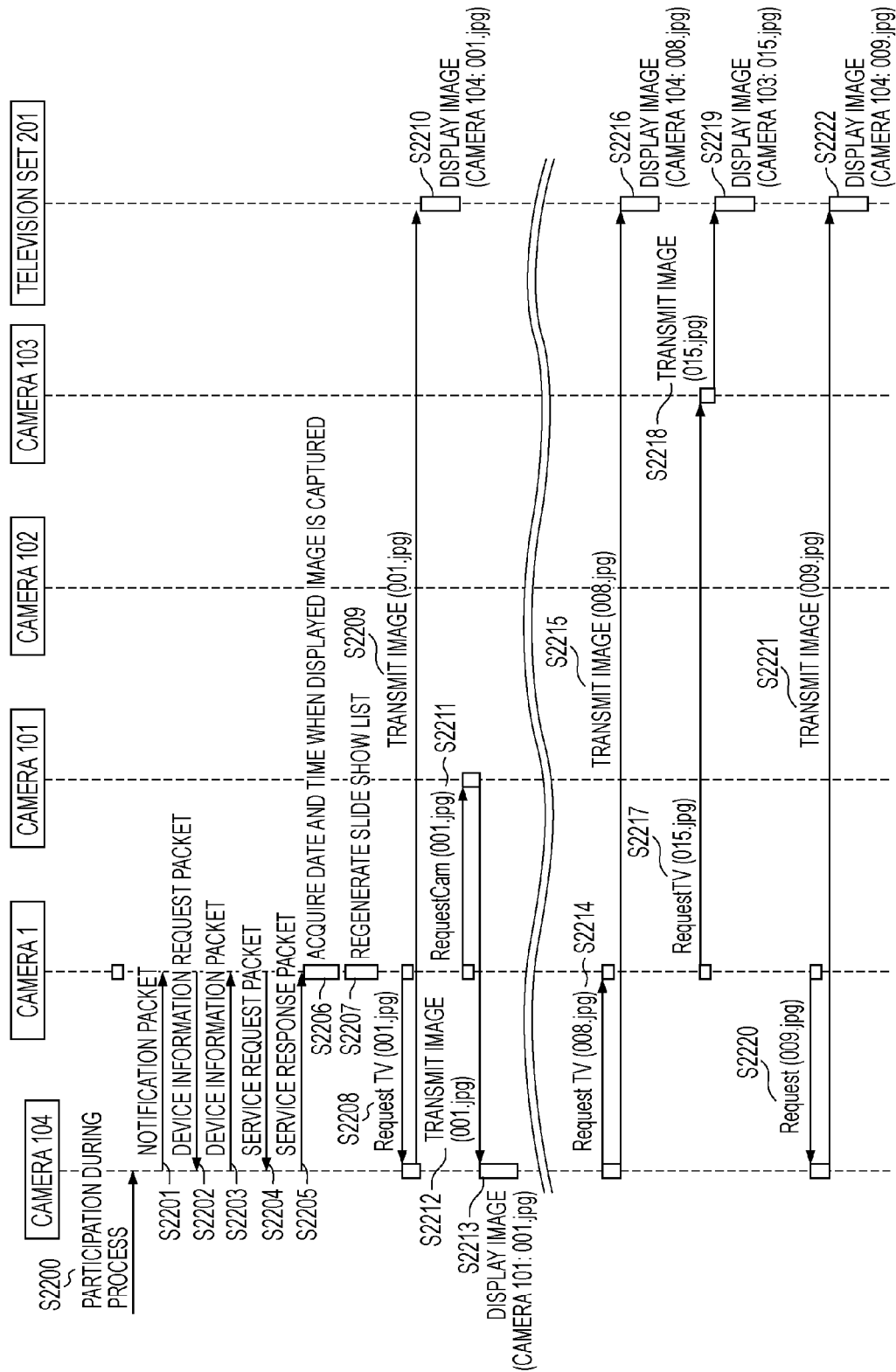
FIG. 22 is a sequence chart illustrating a process according to a third exemplary embodiment.

FIG. 22 is a sequence chart illustrating a process according to the present embodiment when a new device participates in the network. A case will now be described where the new child camera 104 participates in the network during slide show. The steps before the new child camera 104 participates in the network are similar to Steps S1401 to S1406 in FIG. 14.

FIG. 23 illustrates a slide show list 2300 at a certain time point during the slide show. It is assumed in the present embodiment that, in Step S2200, the child camera 104 participates in the network at a time point when the slide show has been performed up to the image corresponding to an order A+1 indicated in a row 2304 in the slide show list 2300. FIG. 24 illustrates an image list 2400 indicating the images held in the child camera 104.

In Steps S2200 to Step S2207 in FIG. 22, the image list 2400 of the images held in the child camera 104, which participates in the network during the slide show, is generated to regenerate a slide show list 2500. These steps are similar to the ones according to the first exemplary embodiment and correspond to Steps S1407 to S1412 and Steps S1415 to S1416 in FIG. 14.

A process after the regeneration of the slide show list is completed in Step S2207 will now be described. FIG. 25 illustrates the slide show list 2500 that is regenerated.

The parent camera 1 controls the television set 201 so as to display the images captured before "05/24/06 09:35", indicated in rows 2401 to 2405 in the image list 2400. As a result, it is possible to display all the images that are not played back, among the images held in the child camera 104 participating in the network during the slide show, in the regenerated slide show list 2500.

Concurrently with the above step, the parent camera 1 controls the child camera 104 so as to display in the display unit 13 the images captured at and before "05/24/06 09:35", indicated in rows 2301 to 2304, among the images in the active slide show list 2300. Since the images indicated in the rows 2301 to 2304 have been subjected to the slide show, it is not necessary for the users other than the user of the child camera 104 to view the images indicated in the rows 2301 to 2304. Accordingly, the parent camera 1 controls the child camera 104 so as to display the images indicated in the rows 2301 to 2304 only in the display unit 13 of the child camera 104. With this step, the user of the child camera 104 participating in the network during the slide show can view the images that have been subjected to the slide show and that the user missed.

After the display of the images is completed, the parent camera 1 controls the television set 201 so as to display the slide show in accordance with the regenerated slide show list 2500.

The above-described process will now be described again with reference to FIG. 26. The images in the active slide show list 2300 and the image list 2400 of the child camera 104 that has newly participated in the network are arranged in the order of the shooting date and time in FIG. 26. Reference numerals and letters, such as A, A+1, A+2, B, B+1, and B+2 denote the orders in the lists in FIGS. 23 and 24.

For example, it is assumed that the child camera 104 newly participates in the network at a time point 2604 while the image of the order A+1 indicated in the row 2304 in the slide show list 2300 is being displayed. In this case, the parent camera 1 regenerates the slide show list of a group 2603 (image group 2603) of images captured after the time point 2604.

The parent camera 1 controls the television set 201 so as to display a group 2602 (image group 2602) of images captured before the time point 2604, among the images in the image list 2400 of the child camera 104 that has newly participated in the network.

Concurrently with the control of the display in the television set 201, the parent camera 1 controls the child camera 104 so as to display a group 2601 (image group 2601) of images captured before the time point 2604, among the images in the active slide show list 2300, in the display unit 13 of the child camera 104.

After the display of the image group 2602 is completed, the parent camera 1 controls the television set 201 so as to display the image group 2603 in accordance with the new slide show list.

The parent camera 1 may control the display of the image group 2601 independently of the display of the image group 2602 and may arbitrarily set the display interval of the images in each display control. The parent camera 1 may start the display control of the image group 2603 after the parent camera 1 confirms that both the display control of the image group 2601 and the display control of the image group 2602 are completed. Alternatively, the parent camera 1 may start the display control of the image group 2603 at the time point when the display control of the image group 2602 is completed, without waiting the completion of the display control of the image group 2601.

With the display control described above, each user can view all the images without omission and duplication even if a new device participates in the network.

Referring back to FIG. 22, Steps S2208 and the subsequent steps will now be described.

After the regeneration of the slide show list is completed in Step S2207, the parent camera 1 starts the display control of the image group 2602.

In Step S2208, the parent camera 1 reads out the first image indicated in the row 2401 in the image list 2400 of the child camera 104 to acquire the camera ID and the image ID. The camera ID is "Camera 104" and the image ID is "001.jpg" in the row 2401 in the image list 2400 in FIG. 24. Accordingly, the parent camera 1 transmits the display request packet to request the display of the image having the image ID "001.jpg" in the display unit 203 of the television set 201 to the child camera 104.

After receiving the display request packet, in Step S2209, the child camera 104 reads out the image specified in the display request packet from the memory card 30 and transmits the readout image to the television set 201.

After receiving the image from the child camera 104, in Step S2210, the television set 201 displays the received image in the display unit 203.

The parent camera 1 controls the display of the image group 2601 concurrently with the display control of the image group 2602. Specifically, in Step S2211, the parent camera 1 reads out the first image indicated in the row 2301 in the active slide show list 2300 to acquire the camera ID and the image ID. The camera ID is "Camera 101" and the image ID is "001.jpg" in the row 2301 in the slide show list 2300. Accordingly, the parent camera 1 transmits the display request packet to request the display of the image having the image ID "001.jpg" in the child camera 104 to the child camera 101. Information used for controlling the child camera 104 so as to display the image is described in the display request packet.

After receiving the display request packet, in Step S2212, the child camera 101 reads out the image specified in the display request packet from the memory card 30 and transmits the readout image to the child camera 104.

After receiving the image, in Step S2213, the child camera 104 displays the received image in the display unit 13.

Although not illustrated, the parent camera 1 sequentially controls the display of the images in the image groups 2601 and 2602.

After displaying the last image in the image group 2602 in Steps S2214 to S2216, the parent camera 1 moves to the display control of the image group 2603.

The display of the image group 2603 is performed in the same manner as in the first exemplary embodiment. Steps S2217 to S2222 are similar to Steps S1417 to S1422 in FIG. 14.

As described above, the parent camera 1 can control the display of the image group 2601 independently of the display of the image group 2602. The display control is not necessarily performed at the timings illustrated in FIG. 22.

As described above, according to the present embodiment, the images that were subjected to the slide show are displayed in the new device that has participated in the network while the images that are not subjected to the new slide show, among the images held in the new device that has participated in the network, are displayed in the television set 201. With this configuration, all the users can efficiently view all the images.

It is possible to switch between the display control according to the first exemplary embodiment and the display control according to the present embodiment. The switching is performed in response to a user's operation.

Both the process when a new device participates in the network according to the first exemplary embodiment or the present embodiment and the process when a device is separated from the network according to the second exemplary embodiment may be performed.

When the slide show of the image group 2601 and the image group 2602 is performed, the parent camera 1 may set the slide show interval to a shorter value, compared with the slide show of the image group 2603.

Although the image-processing apparatus is embodied by the digital camera in the first to third exemplary embodiments, the image-processing apparatus may be, for example, an image viewer, a personal digital assistant (PDA), or a mobile personal computer (PC), as long as the device is capable of storing and displaying images. The present invention is not restricted by the kind of the image-processing apparatus.

Although the parent camera 1 controls the network in the first to third exemplary embodiments, the television set 201 may control the network. In this case, the television set 201 performs the process as a display apparatus concurrently with the process as a network control apparatus.

The present invention can be embodied by supplying the storage medium storing software program code realizing the functions according to the above embodiments to a system or an apparatus, the computer (or CPU or micro processing unit (MPU)) in which system or apparatus reads out and executes the program code stored in the storage medium. The storage medium may be directly supplied from the system or apparatus or may be supplied through another device.

In this case, the present invention is embodied by the program code itself read out from the storage medium. The present invention is applicable to the program code and the storage medium storing the program code.

The storage medium supplying the program code may be, for example, a flexible disk, a hard disk, a magneto-optical disk (MO), a compact disk-read only memory (CD-ROM), a compact disc recordable (CD-R), a compact disc rewritable (CD-RW), a digital versatile disk-read only memory (DVD-ROM), a digital versatile disk-random access memory (DVD-RAM), a DVD-RW, a DVD+RW, a magnetic tape, a nonvolatile memory card, or a ROM. The program code may be downloaded over a network.

The present invention is embodied by the computer that executes the readout program code to realize the functions of the embodiments described above. In addition, the OS or the like running on the computer may execute all or part of the actual processing based on instructions in the program code to realize the functions of the embodiments described above.

Alternatively, after the program code read out from the storage medium has been written in a memory that is provided in a function expansion board included in the computer or in a function expansion unit connected to the computer, the CPU or the like in the function expansion board or the function expansion unit may execute all or part of the actual processing based on instructions in the program code to realize the functions of the embodiments described above.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-081799 filed Mar. 27, 2007, which is hereby incorporated by reference herein in its entirety.

What is claimed is:

1. A network control apparatus adapted to form a network with a plurality of image-processing apparatuses, the network control apparatus comprising:
    an attribute information acquiring unit configured to acquire attribute information about images stored in each image-processing apparatus of the plurality of image-processing apparatuses;
    an arranging unit configured to arrange a display order of the images based on the attribute information;
    a display-control unit configured to control a display unit so as to sequentially display the images in accordance with the display order; and
    a detecting unit configured to detect a change in the configuration of the image-processing apparatuses on the network,
    wherein in a case that the detecting unit detected the change in the configuration of the image-processing apparatuses on the network while the display-control unit is sequentially displaying the images in accordance with the display order, the arranging unit rearranges the display order in response to such a detected change and the display-control unit continues to sequentially display the images in accordance with the rearranged display order.

2. The network control apparatus according to claim 1,
    wherein the attribute information includes a date and time when each image is captured, and
    wherein the arranging unit arranges the display order based on the date and time when each image is captured.

3. The network control apparatus according to claim 1,
    wherein the change in the configuration of the image-processing apparatuses on the network is addition of a new image-processing apparatus to the network, and
    wherein the network control apparatus is configured so that, if a new image-processing apparatus is added to the network while the display-control unit is sequentially displaying the images in accordance with the display order, the attribute information acquiring unit acquires the attribute information about the images stored in the added image-processing apparatus and the arranging unit rearranges the display order of the images to include the images stored in the added image-processing apparatus.

4. The network control apparatus according to claim 3, further comprising:
    a display information acquiring unit configured to acquire attribute information about an image that is being displayed in the display unit if the new image-processing apparatus is added to the network,
    wherein the arranging unit is adapted to rearrange the display order based on the attribute information of the image that is being displayed, acquired by the display information acquiring unit.

5. The network control apparatus according to claim 4,
    wherein the display-control unit is adapted to control the display unit so as to sequentially display images captured before the date and time when the image having the attribute information acquired by the display information acquiring unit is captured, among the images stored in the new image-processing apparatus, instead of the display of the images in accordance with the rearranged order.

6. The network control apparatus according to claim 5, wherein the display-control unit is adapted to control the display unit in the new image-processing apparatus so as to display images that were displayed before the new image-processing apparatus is added to the network, instead of the display of the images in accordance with the rearranged order.

7. The network control apparatus according to claim 4, wherein the display-control unit is adapted to control the display unit in the new image-processing apparatus so as to display images that were displayed before the new image-processing apparatus is added to the network, instead of the display of the images in accordance with the rearranged order.

8. The network control apparatus according to claim 1, further comprising:
a display information acquiring unit configured to acquire the attribute information about the image that is being displayed in the display unit if the new image-processing apparatus is added to the network,
wherein the display-control unit is adapted to cause sequential display of images captured after the date and time when the image having the attribute information acquired by the display information acquiring unit is captured.

9. The network control apparatus according to claim 1, further comprising:
a display information acquiring unit configured to acquire the attribute information about the image that is being displayed in the display unit if the new image-processing apparatus is added to the network while the display-control unit is sequentially displaying the images in accordance with the display order,
wherein the display-control unit is adapted to cause sequential display of the images captured within a predetermined time period with respect to the date and time when the image having the attribute information acquired by the display information acquiring unit is captured.

10. The network control apparatus according to claim 1, wherein the attribute information includes a position where each image is captured, and wherein the arranging unit is adapted to arrange the display order based on the position where each image is captured.

11. The network control apparatus according to claim 1, wherein the change in the configuration of the image-processing apparatuses on the network is disconnection of an image-processing apparatus from the network, and wherein the arranging unit is adapted to rearrange the display order of the images so that the images stored in the image-processing apparatus that is disconnected from the network are excluded.

12. A network comprising a network control apparatus according to claim 1, a display unit, and a plurality of image-processing apparatuses.

13. A method of controlling a network including a plurality of image-processing apparatuses, the method comprising:
acquiring attribute information about images stored in each image-processing apparatus of the plurality of image-processing apparatuses;

arranging a display order of the images based on the attribute information;
sequentially displaying the images in a display unit in accordance with the display order; and
detecting a change in the configuration of the image-processing apparatuses on the network,
wherein in a case that the change is detected in the configuration of the image-processing apparatuses on the network while sequentially displaying the images in accordance with the display order, the display order in response to the detected change is rearranged, and the images are continued to be sequentially displayed in accordance with the rearranged display order.

14. A computer-readable storage medium storing a program adapted to be executed by a network control apparatus, which controls a network including a plurality of image-processing apparatus, the program when executed causing the network control apparatus to:
acquire attribute information about images stored in each image-processing apparatus of the plurality of image-processing apparatuses;
arrange a display order of the images based on the attribute information;
sequentially display the images in a display unit in accordance with the display order; and
detect a change in the configuration of the image-processing apparatuses on the network,
wherein in a case that the change is detected in the configuration of the image-processing apparatuses on the network while the network control apparatus sequentially displays the images in accordance with the display order, the program causes the network control apparatus to rearrange the display order in response to the detected change and continue to sequentially display the images in accordance with the rearranged display order.

15. A network control apparatus adapted to form a network with a plurality of image-processing apparatuses, the network control apparatus comprising:
attribute information acquiring means for acquiring attribute information about images stored in each image-processing apparatus of the plurality of image-processing apparatuses;
arranging means for arranging a display order of the images based on the attribute information;
display-control means for controlling display means so as to sequentially display the images in accordance with the display order; and
detecting means for detecting a change in the configuration of the image-processing apparatuses on the network,
wherein in a case that the detecting means detected the change in the configuration of the image-processing apparatuses on the network while the display-control means sequentially displays the images in accordance with the display order, the arranging means rearranges the display order in response to such a detected change and the display-control means continues to sequentially display the images in accordance with the rearranged display order.

* * * * *